United States Patent
Katsui et al.

(10) Patent No.: US 6,772,045 B2
(45) Date of Patent: Aug. 3, 2004

(54) SYSTEM FOR DETERMINING DRY CLEANING TIMING, METHOD FOR DETERMINING DRY CLEANING TIMING, DRY CLEANING METHOD, AND METHOD FOR MANUFACTURING SEMICONDUCTOR DEVICE

(75) Inventors: Shuji Katsui, Oita (JP); Masayuki Tanaka, Yokohama (JP); Masaki Kamimura, Yokohama (JP); Hiroshi Akahori, Yokohama (JP); Ichiro Mizushima, Yokohama (JP); Takashi Nakao, Kawasaki (JP); Akihito Yamamoto, Yokohama (JP); Shigehiko Saida, Yokkaichi (JP); Yoshitaka Tsunashima, Yokohama (JP); Yuuichi Mikata, Tsukuba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/231,019

(22) Filed: Aug. 30, 2002

(65) Prior Publication Data

US 2003/0139835 A1 Jul. 24, 2003

(30) Foreign Application Priority Data

Aug. 30, 2001 (JP) .................................... P2001-262294

(51) Int. Cl.[7] .............................................. G06F 19/00
(52) U.S. Cl. ...................... 700/207; 700/208; 700/300; 237/2 R; 432/36; 438/905
(58) Field of Search ............................... 700/117, 121, 700/99, 207, 208, 300; 427/255, 28; 438/905; 237/2 R; 432/36

(56) References Cited

U.S. PATENT DOCUMENTS

| | | | | |
|---|---|---|---|---|
| 5,274,931 A | * | 1/1994 | Ogiri et al. | 34/536 |
| 5,616,208 A | * | 4/1997 | Lee | 156/345.24 |
| 5,951,772 A | * | 9/1999 | Matsuse et al. | 118/723 R |
| 2002/0164880 A1 | * | 11/2002 | Shimizu et al. | 438/707 |

FOREIGN PATENT DOCUMENTS

| | | |
|---|---|---|
| JP | 2000-200779 | 7/2000 |
| JP | 2001-152341 | 6/2001 |

* cited by examiner

*Primary Examiner*—Leo Picard
*Assistant Examiner*—Carlos R. Ortiz
(74) *Attorney, Agent, or Firm*—Finnegan, Henderson, Farabow, Garrett & Dunner, L.L.P.

(57) ABSTRACT

A system for determining dry cleaning timing, includes: a manufacturing apparatus configured to process materials assigned by a sequence of lots; an apparatus controller configured to control the manufacturing apparatus and obtaining operational conditions of the manufacturing apparatus as apparatus information; a lot information input terminal configured to obtain process conditions of one of the lots as lot information; an apparatus information storage unit configured to store the apparatus information from the apparatus controller as an apparatus information database; a lot information storage unit configured to store the lot information from the lot information input terminal as a lot information database; and a cleaning determination unit configured to determine timing to perform a dry cleaning of the manufacturing apparatus based on the apparatus information database and the lot information database.

27 Claims, 24 Drawing Sheets

FIG.3

| MACROSCOPIC EVALUATION WITH PROFILER | | MICROSCOPIC EVALUATION WITH AFM | |
|---|---|---|---|
| | Ra | P-V | Ra | P-V |
| REPETITIVE | 0.007~0.011 | 0.042~0.075 | 0.008 | 0.127~0.137 |
| ONE-STEP | 0.14~0.52 $\mu$m | 1.2~8.9 $\mu$m | 0.011 $\mu$m | 0.344~0.372 $\mu$m |

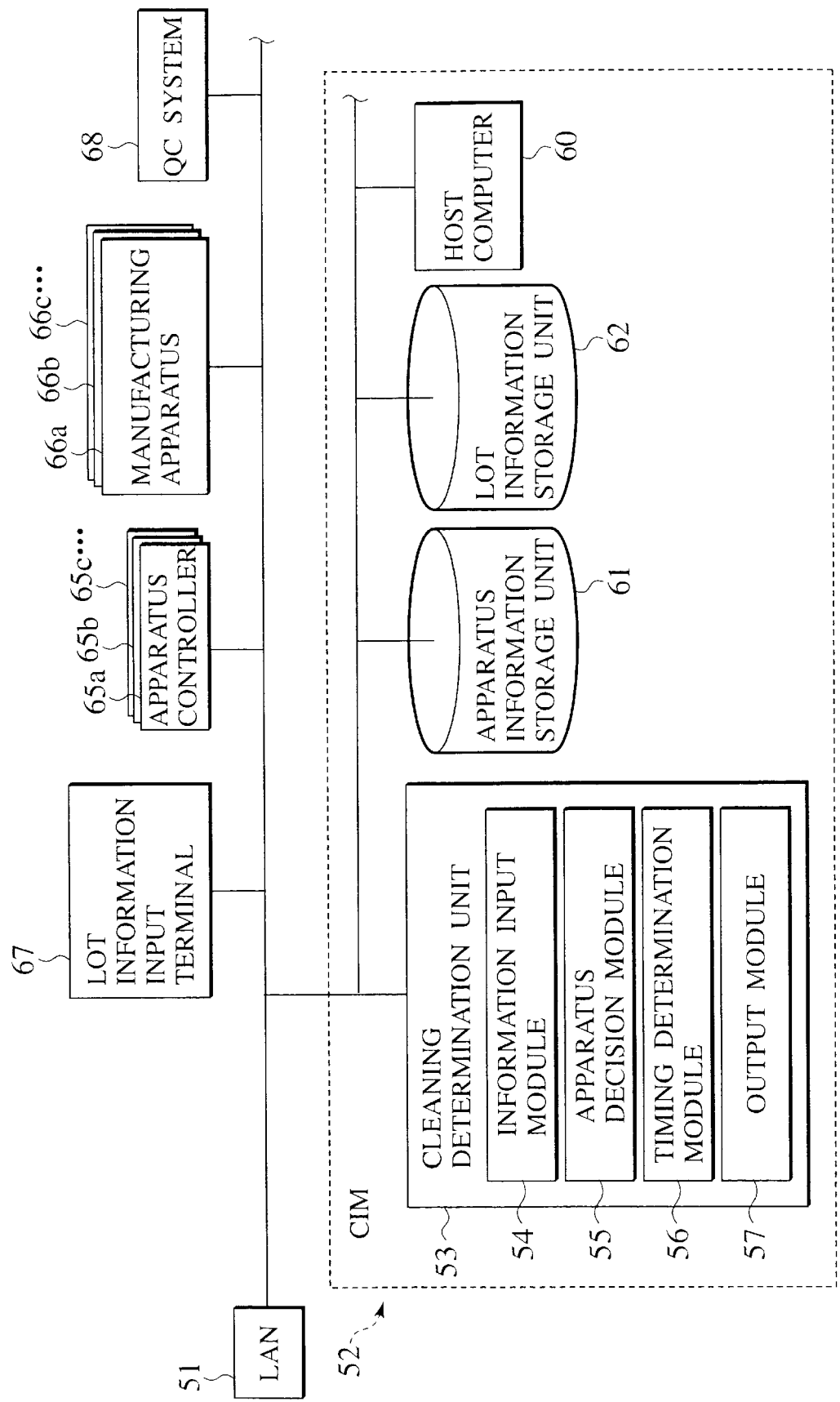

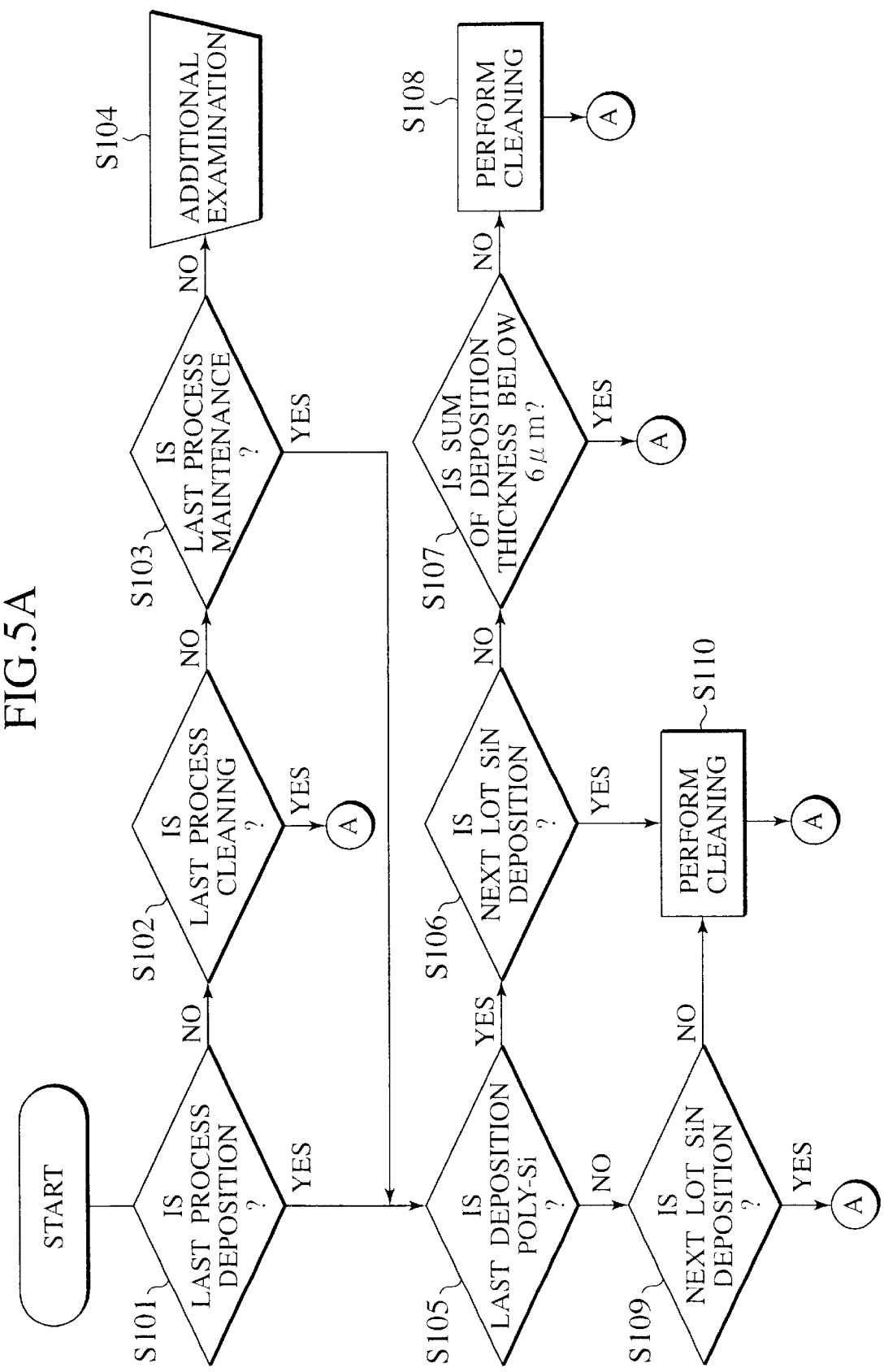

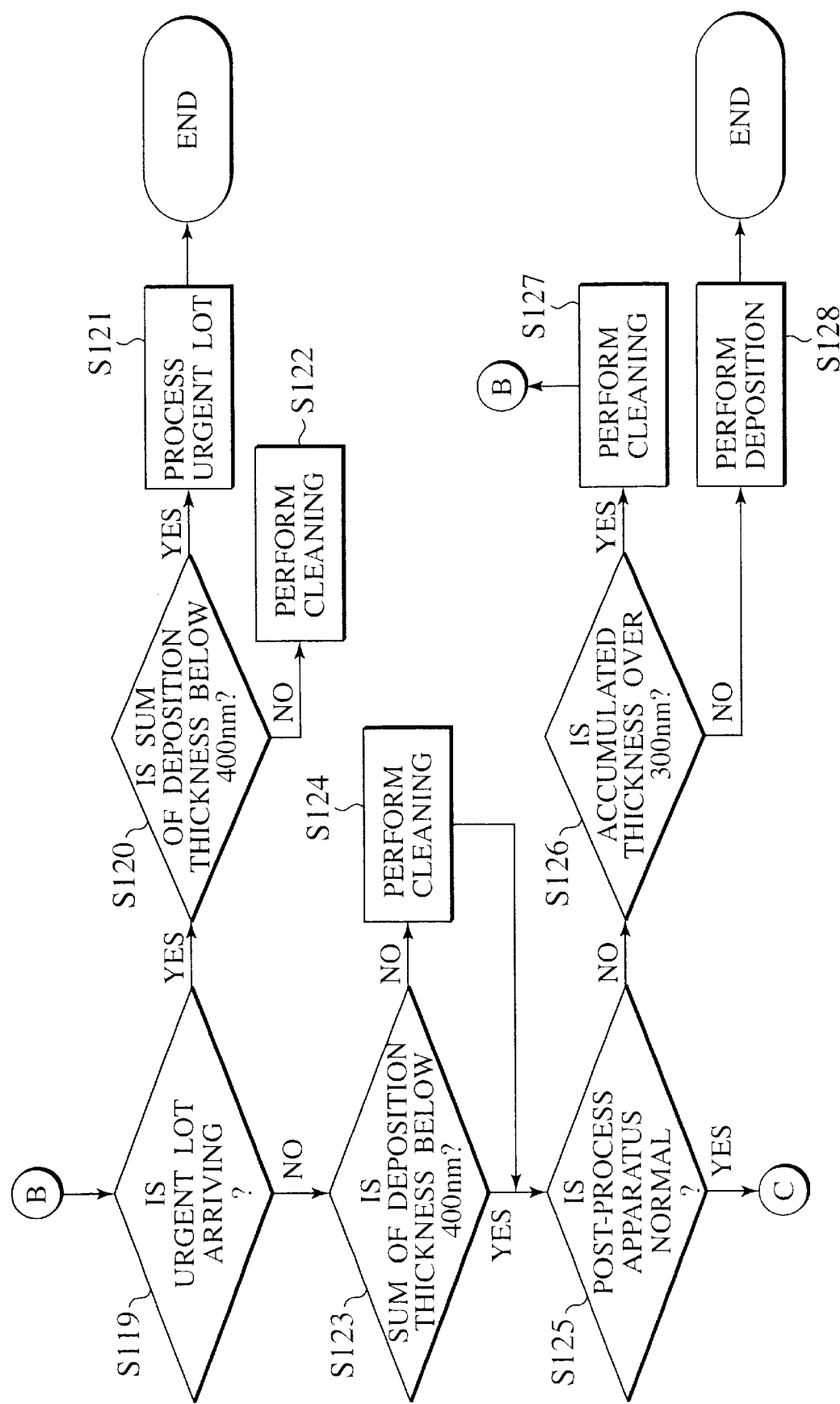

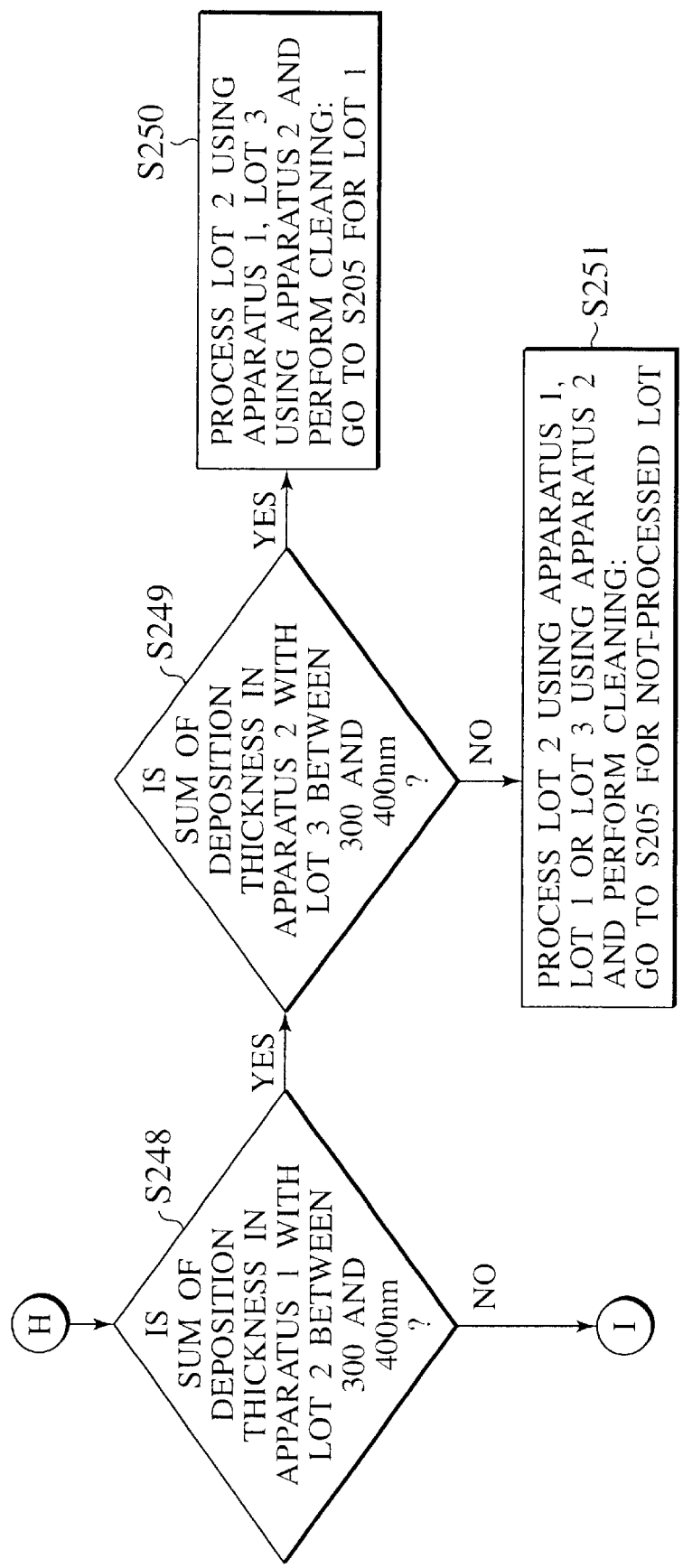

SYSTEM FOR DETERMINING DRY CLEANING TIMING, METHOD FOR DETERMINING DRY CLEANING TIMING, DRY CLEANING METHOD, AND METHOD FOR MANUFACTURING SEMICONDUCTOR DEVICE

CROSS REFERENCE TO RELATED APPLICATIONS

This application is based upon and claims the benefit of priority from prior Japanese Patent Application 2001-262294 filed on Aug. 30, 2001; the entire contents of which are incorporated by reference herein.

BACKGROUND OF THE INVENTION

1. Field of the Invention

The present invention relates to dry cleaning using a halogen gas for a manufacturing apparatus. In particular, it relates to a system determining timing to perform dry cleaning for the manufacturing apparatus, a method for reducing damage to the manufacturing apparatus in performing dry cleaning, and a method for efficiently controlling the dry cleaning.

2. Description of the Related Art

In a chemical vapor deposition (CVD) apparatus for semiconductor manufacturing, especially in a low pressure CVD (LPCVD) apparatus, a film such as a silicon oxide ($SiO_2$) film accumulates on a wall of a CVD chamber. When an accumulated deposition film grows too thick, problems may occur, such as a dust contamination caused by the peeling of the deposition film, and also a lack of uniformity in a film thickness deposited on a semiconductor wafer caused by a non-homogeneous deposition in the CVD chamber. Conventionally, before these problems come to the forefront, a dry cleaning by a cleaning gas including a halogen such as a chlorine trifluoride ($ClF_3$) gas is used to remove the accumulation of the deposition film in the CVD chamber.

Typically, the dry cleaning is carried out when conditions develop where normal processing with required quality becomes difficult, such as the dust contamination occurs because of the peeling of the film due to excess thickness of the accumulation of the deposition film in the CVD chamber, or deterioration of the uniformity of the film thickness on top of the wafer develops due to non-homogeneous deposition. In addition, through experience, it is possible to understand when the excessive accumulation conditions will occur, and being subject to these problems, a cleaning schedule may be determined.

In addition, in the LPCVD apparatus, for example, upon arrival of a lot for a corresponding process, a target film thickness for the film deposition and respective accumulated deposition thicknesses in a single or a plurality of apparatuses are speculated. Thereafter, the LPCVD apparatus is determined the timing of cleaning and selected for the film deposition from the apparatuses wherein a specific film thickness is not exceeded. These selections all depend on manual decision.

Similarly, when performing cleaning, determination whether or not to perform cleaning on the LPCVD apparatus is made through manual decision based on the determination of those apparatuses where accumulated deposition thickness exceeds a preset value or film deposition thickness of a lot scheduled for processing. Thus, conventionally, for a single or a plurality of apparatuses, manual decision is used to decide whether to implement film deposition or implement cleaning based solely on the accumulated deposition thickness in each apparatus.

In addition, when performing cleaning, especially using the $ClF_3$ gas, the CVD chamber is set to conditions of a certain temperature and pressure, and the $ClF_3$ gas in addition to an inert gas, such as nitrogen ($N_2$) are fed into the CVD chamber in order to remove the deposited film. When removing the deposited film, an active gas such as $ClF_3$ is merely mixed with an inert gas such as $N_2$. No countermeasure is taken for reducing the cleaning time by increasing an etching rate, and for improving selectivity between the deposited film and the CVD chamber components. In addition, cleaning time is determined to be sufficient through experience in view of the accumulated film type and the accumulated deposition thickness. However, since an end point is not actually known, the cleaning is applied for a longer time than necessary, and damage to the components due to this excessive time is not considered.

Thus, in the conventional LPCVD apparatus, for example, a cleaning schedule is determined solely by the problems associated with the film deposition performance, and the damage to the CVD chamber components due to cleaning is not considered. Therefore, there are disadvantages such as increased frequency of apparatus component maintenance, increased load on the operator, and increased cost of ownership (COO).

In either case of depositing a film or performing cleaning, a person determines which of a single or a plurality of apparatuses should be used based solely on the accumulated deposition thickness value in each of the apparatus. Therefore, since efficient determination cannot be performed in a short time based on information such as a production flow condition of the multiple lots, a post-process apparatus condition, an operation of incidental facilities, a maintenance prediction, and an accumulated deposition thickness of the apparatus, inconveniences such as delay of the lot processing may occur.

In addition, the conventional method using a pure $ClF_3$ gas does not improve the etching rate and selectivity. Moreover, performing processing for a sufficient length of time without knowing the cleaning end point invites enormous time and costs for the cleaning process itself, in addition to gas dissipation. In addition, since cleaning is performed for a time duration in excessive of the optimum duration, damage to the CVD chamber components increases.

In addition, for example etching gas such as a $ClF_3$ is used in a dry cleaning method for the deposited film inside the LPCVD apparatus. Typically, in the LPCVD process, not only is the target film adhered to the inside wall of the CVD chamber in the LPCVD apparatus, but by-products may also agglutinate on portions from an exhaust piping to a vacuum pump. Therefore, with the cleaning, it is better that cleaning removal be possible for not only the deposited film on the wall of the CVD chamber but also by-products. Nevertheless, currently, the cleaning is not performed for the exhaust piping and the vacuum pump since determination of the cleaning end point is not clear.

In addition, since the cleaning rate at higher temperature is faster, cleaning is performed under heated conditions. However, in order to avoid simultaneous damage to the CVD chamber components, the temperature cannot be raised excessively. As the result, the cleaning process is performed under conditions allowing a certain degree of selectivity to be obtained between the deposited film and the CVD chamber components and giving a tolerable cleaning rate for the deposited film. The cleaning time is set to be sufficiently long as required. Therefore, since the cleaning ends quickly at locations in the upstream of the etching gas flow, an over-etching time is longer in the upstream and may make it easier for problems to occur such as damage to the CVD chamber components.

SUMMARY OF THE INVENTION

A first aspect of the present invention inheres in a system for determining dry cleaning timing, including: a manufacturing apparatus configured to process materials assigned by a sequence of lots; an apparatus controller configured to control the manufacturing apparatus and obtaining operational conditions of the manufacturing apparatus as apparatus information; a lot information input terminal configured to obtain process conditions of one of the lots as lot information; an apparatus information storage unit configured to store the apparatus information from the apparatus controller as an apparatus information database; a lot information storage unit configured to store the lot information from the lot information input terminal as a lot information database; and a cleaning determination unit configured to determine timing to perform a dry cleaning of the manufacturing apparatus based on the apparatus information database and the lot information database.

A second aspect of the present invention inheres in a method for determining dry cleaning timing, including: obtaining operational conditions of a manufacturing apparatus as apparatus information; obtaining process conditions of one of lots processed in the manufacturing apparatus as lot information; and determining timing to perform a dry cleaning for the manufacturing apparatus based on the apparatus information and the lot information.

A third aspect of the present invention inheres in a dry cleaning method including: depositing a film in a manufacturing apparatus; obtaining operational conditions of the manufacturing apparatus as apparatus information; obtaining process conditions of one of lots to be processed in the manufacturing apparatus as lot information; determining timing to perform a dry cleaning for the manufacturing apparatus based on the apparatus information and the lot information; and performing the dry cleaning with a cleaning gas including a halogen gas.

A fourth aspect of the present invention inheres in a method for manufacturing a semiconductor device, including: depositing a film in a manufacturing apparatus; obtaining operational conditions of the manufacturing apparatus as apparatus information; obtaining process conditions of one of lots to be processed in the manufacturing apparatus as lot information; determining timing to perform a dry cleaning for the manufacturing apparatus based on the apparatus information and the lot information; performing the dry cleaning with a cleaning gas including a halogen gas; loading semiconductor wafers assigned as the one of the lots in a chamber of the manufacturing apparatus; and performing a film deposition on the semiconductor wafers.

BRIEF DESCRIPTION OF DRAWINGS

FIG. 3 is a table presenting a surface roughness of the quartz tips processed in the CVD chamber according to the first embodiment of the present invention;

FIG. 4 is a schematic diagram of a semiconductor manufacturing system according to the first embodiment of the present invention;

FIGS. 5A through 5D are flowcharts in the case of processing a single lot with a single LPCVD apparatus according to the first embodiment of the present invention;

FIGS. 6A through 6I are flowcharts in the case of processing multiple lots with multiple LPCVD apparatuses according to a second embodiment of the present invention;

DETAILED DESCRIPTION OF THE INVENTION

Figure 1:
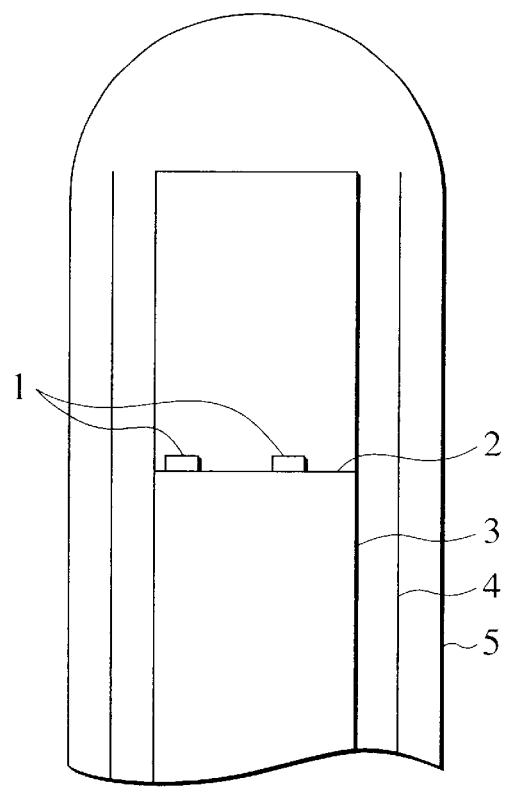
FIG. 1 is a schematic cross-sectional diagram illustrating a CVD chamber of a LPCVD apparatus according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

The present invention relates to dry cleaning using a cleaning gas including at least a halogen gas, which performs cleaning through etching of a film deposited on a wall of a CVD chamber of a semiconductor manufacturing apparatus.

First Embodiment

In the first embodiment, an LPCVD apparatus is used as an example of a semiconductor manufacturing apparatus. The CVD chamber of the LPCVD apparatus includes a quartz outer tube 5 and quartz inner tube 4, and a quartz boat 3 is arranged in the inside of the quartz inner tube 4, as shown FIG. 1. In the first embodiment, a quartz wafer 2 is arranged in the quartz boat 3. Quartz tips 1 are placed on this quartz wafer 2, a silicon nitride ($Si_3N_4$) film is deposited upon the quartz tips 1 by the LPCVD method, and dry cleaning is performed using a cleaning gas. A dry cleaning using a $ClF_3$ gas as the cleaning gas is performed under conditions such that the growth of the $Si_3N_4$ film thickness does not exceed 400 nm. In comparison, as the conventional case, the dry cleaning is performed with an accumulated deposition thickness of between 1 and 1.5 $\mu$m. The surface condition of the quartz tips 1 is kept clean like as in an initial condition, shown in FIG. 2A for the condition not to exceed 400 nm. However the surface condition of the quartz tip 1 deteriorates as shown in FIG. 2B.

The details of performing a $Si_3N_4$ film deposition and dry cleaning are shown below.

The CVD conditions are;
- CVD temperature: 780° C.,
- CVD pressure: 67 Pa,
- flow rate for dichlorosilane ($SiH_2Cl_2$): 50 sccm, and
- flow rate for ammonia ($NH_3$): 500 sccm.

The dry cleaning conditions are;
- cleaning temperature: 400° C.,
- cleaning pressure: 1067 Pa,
- flow rate for $ClF_3$: 900 sccm, and
- flow rate for $N_2$: 1600 sccm.

Under the above conditions, the LPCVD apparatus is used as follows. $Si_3N_4$ film depositions, each following a corresponding dry cleaning are repeated five times. Surface conditions of quartz chips 1 are evaluated for every dry cleaning performed. The $Si_3N_4$ film is deposited 250 nm thick, and cleaning is performed for a time of 40% longer than the time calculated based on etching rate and film thickness. The dry cleanings are performed five times on the deposited film with a thickness of 250 nm, corresponding to a total deposited film thickness of 1250 nm. For comparison with the conventional method, a $Si_3N_4$ film is deposited 1250 nm thick, and cleaning is performed.

Figure 2A:
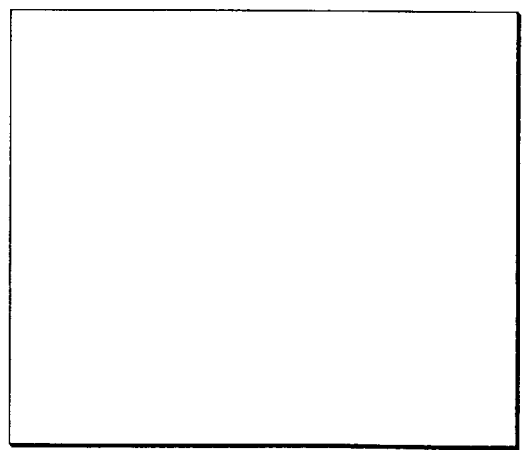
FIG. 2A is an optical micrograph microscope (×100 magnification) of a quartz tip with repetitive processing according to the first embodiment of the present invention.
Figure 2B:
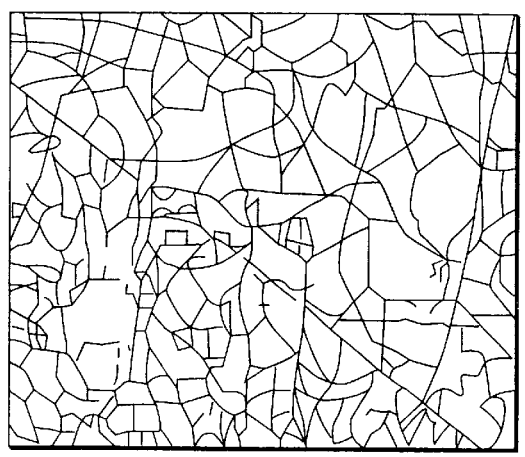
FIG. 2B is an optical micrographs microscope (×100 magnification) of a quartz tip with one-step processing.
Figure 5B:
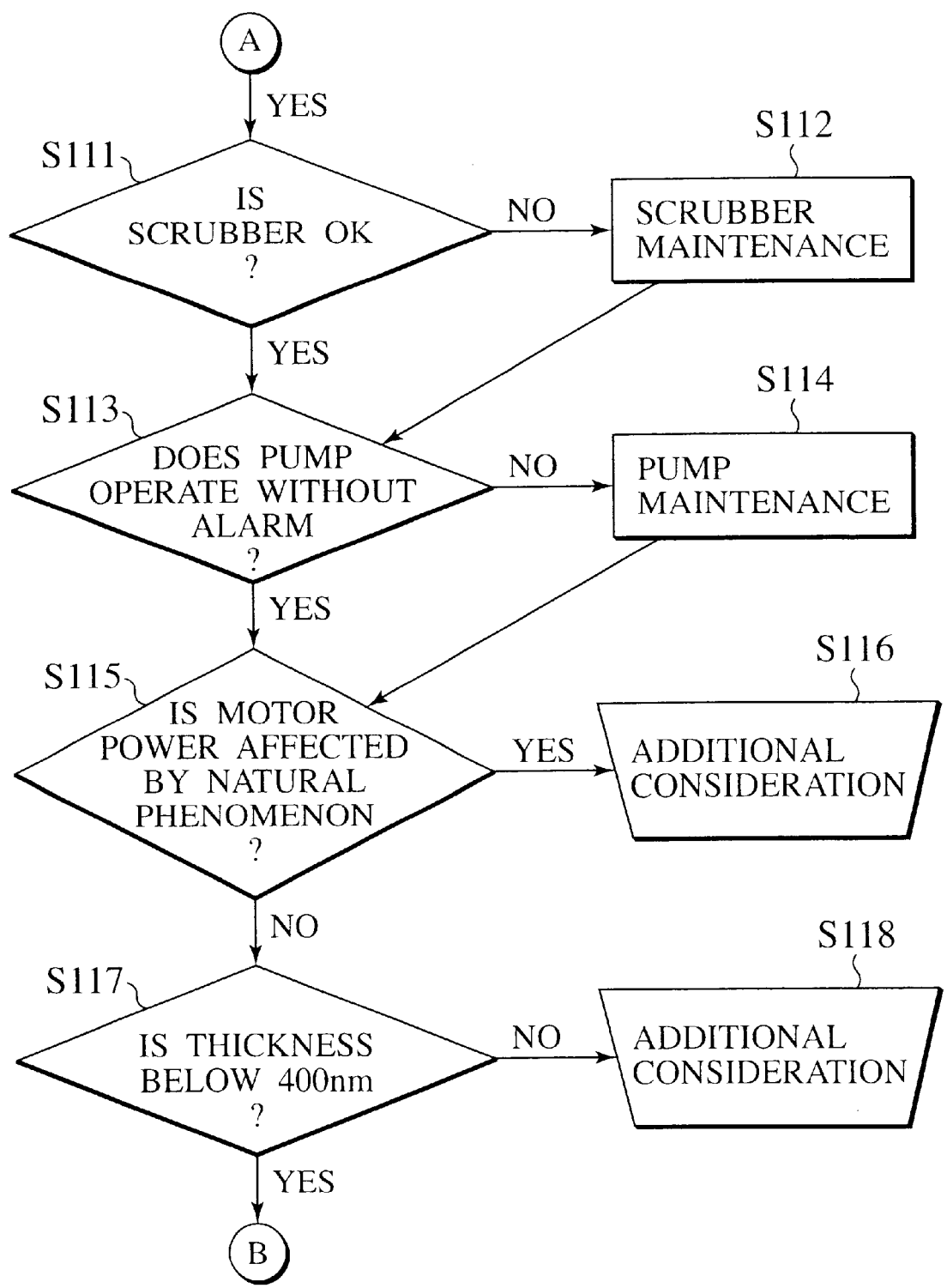
Figure 5D:
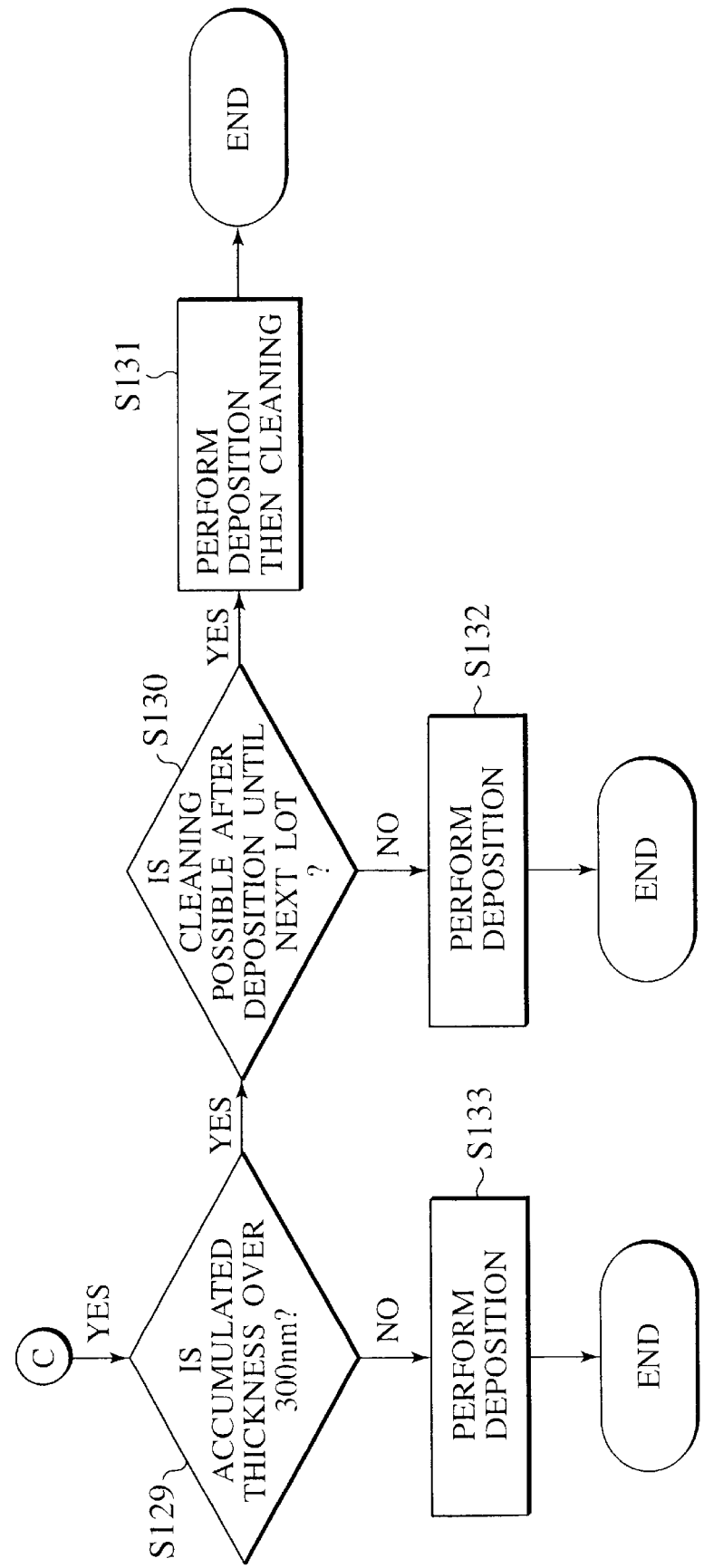
Figure 6A:
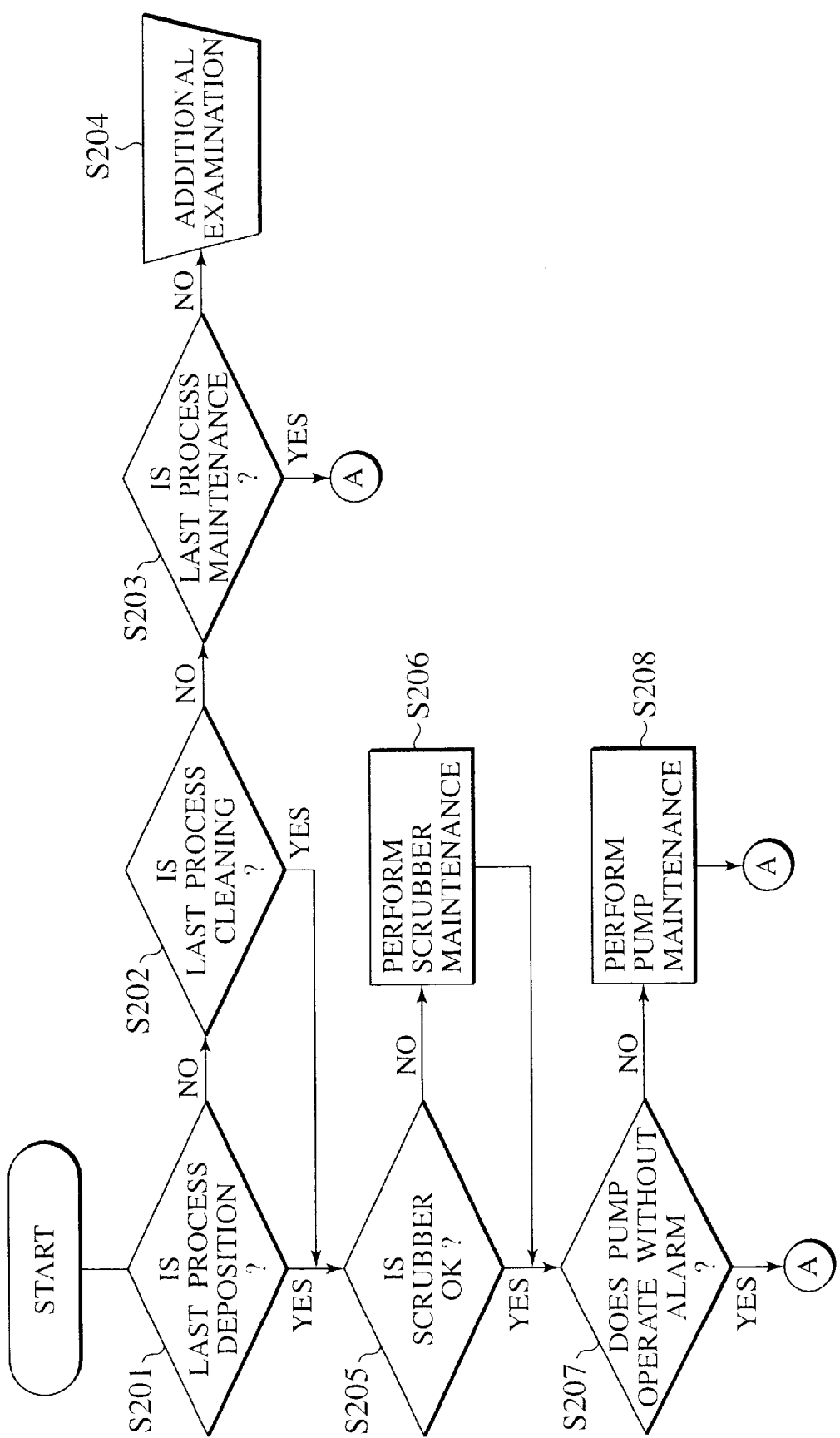
Figure 6B:
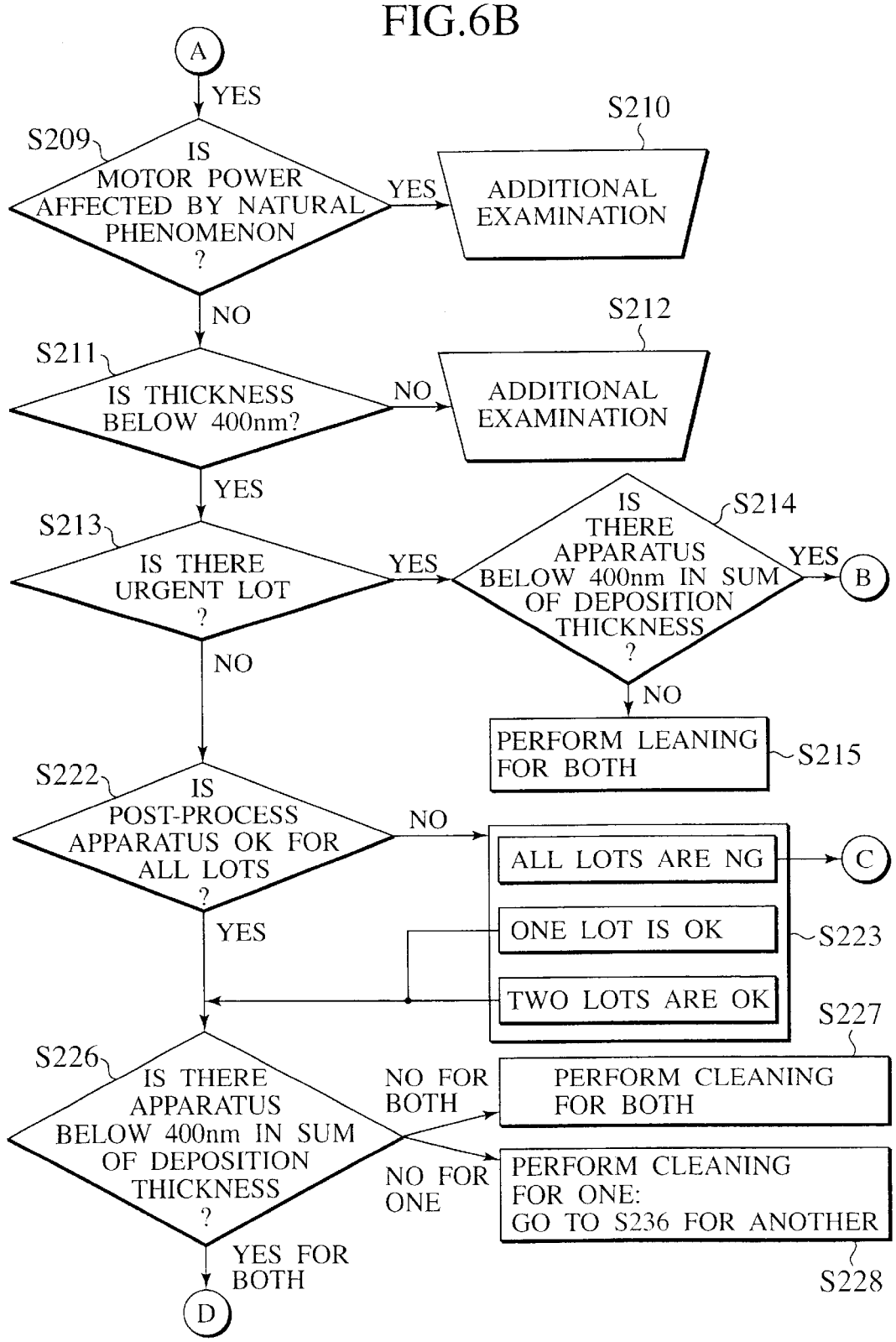
Figure 6C:
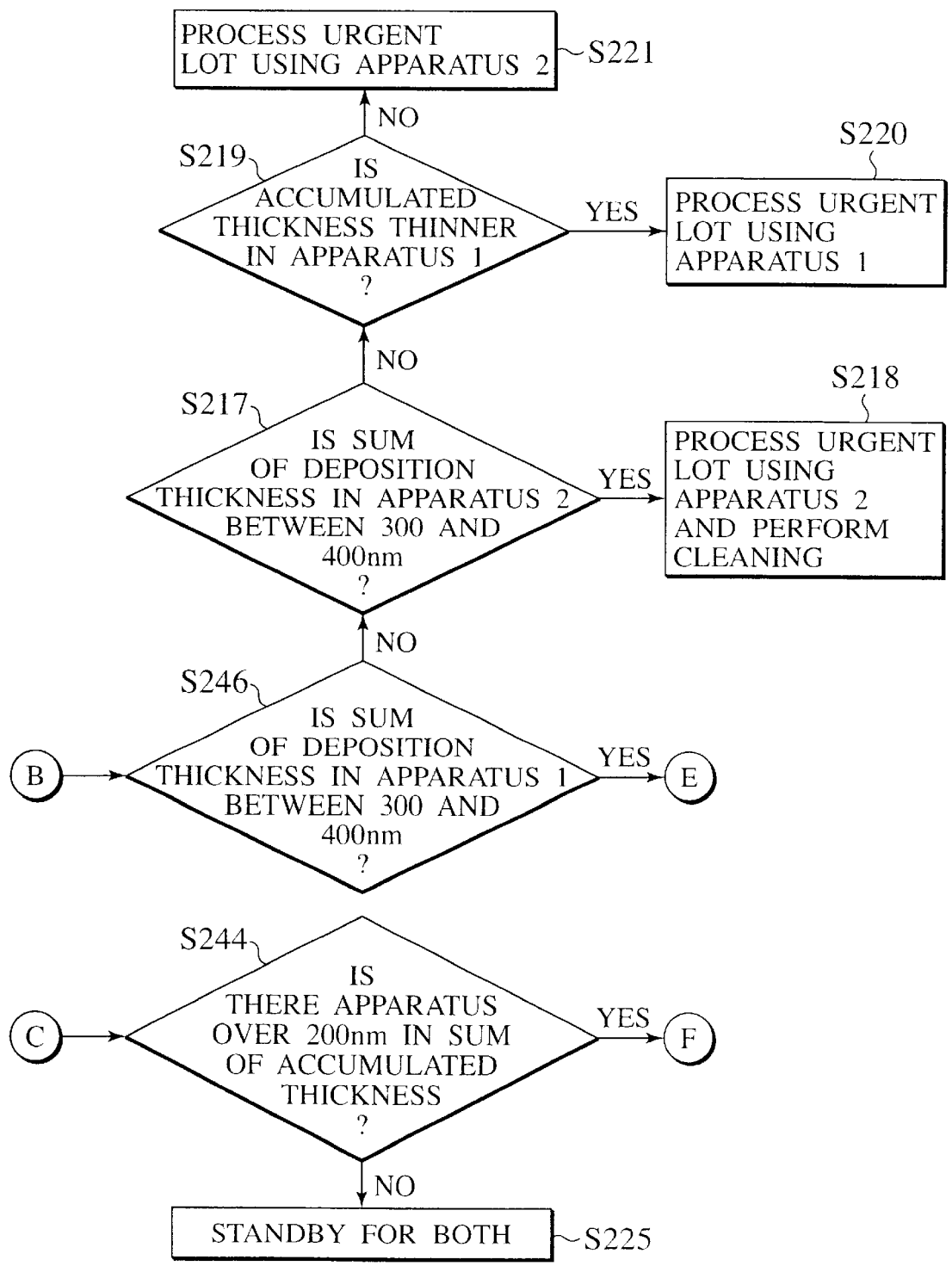
Figure 6D:
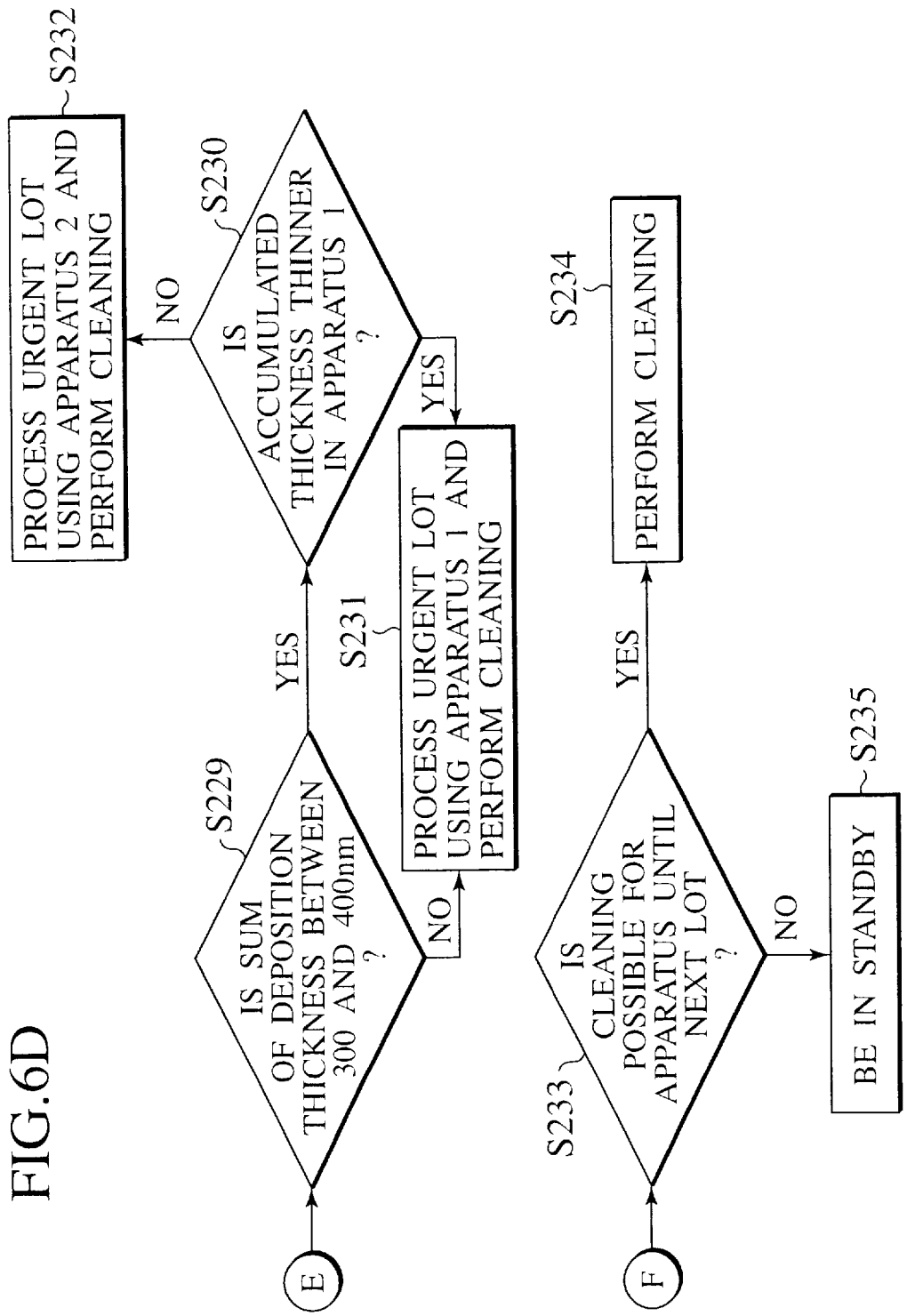
Figure 6E:
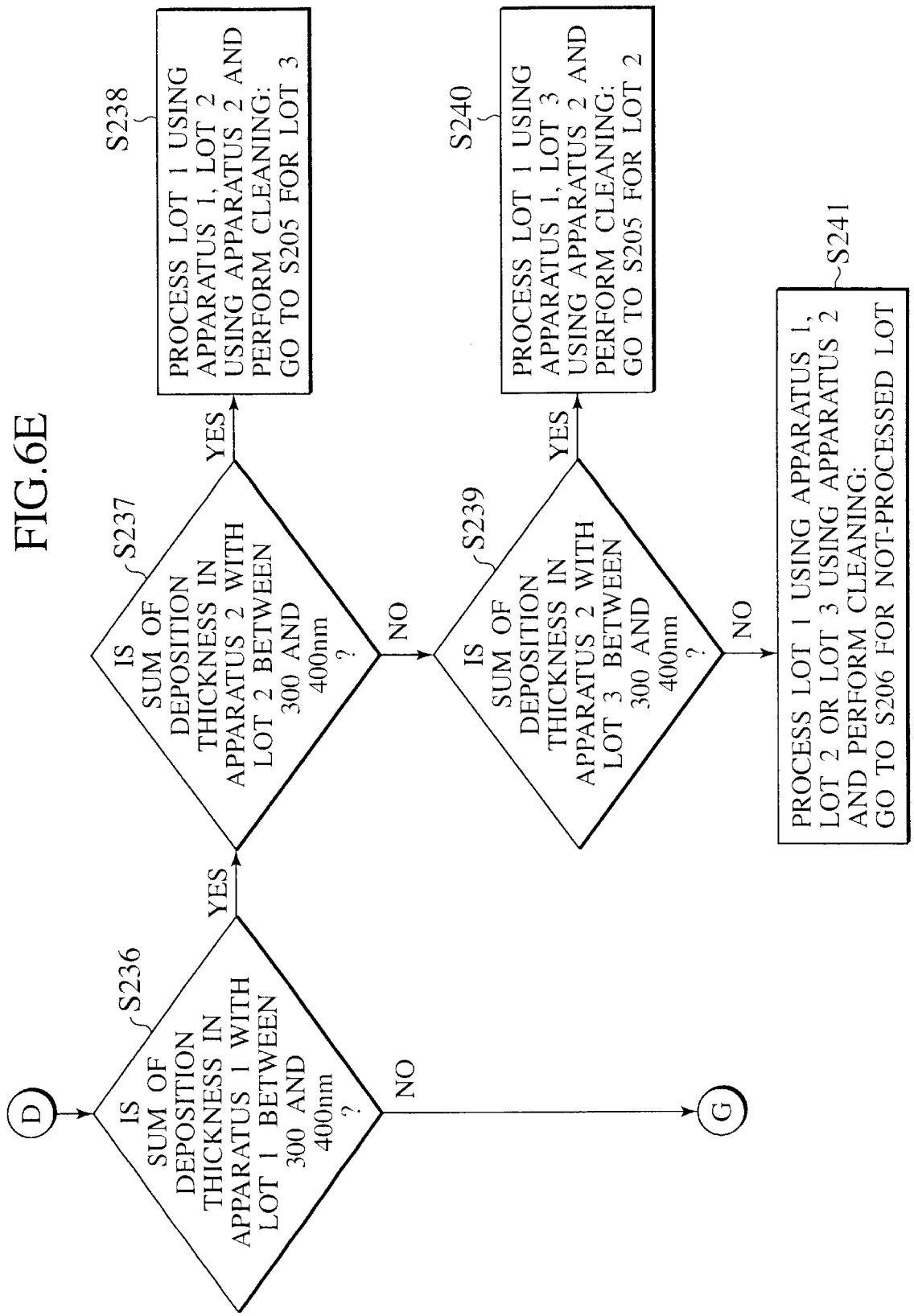
Figure 6F:
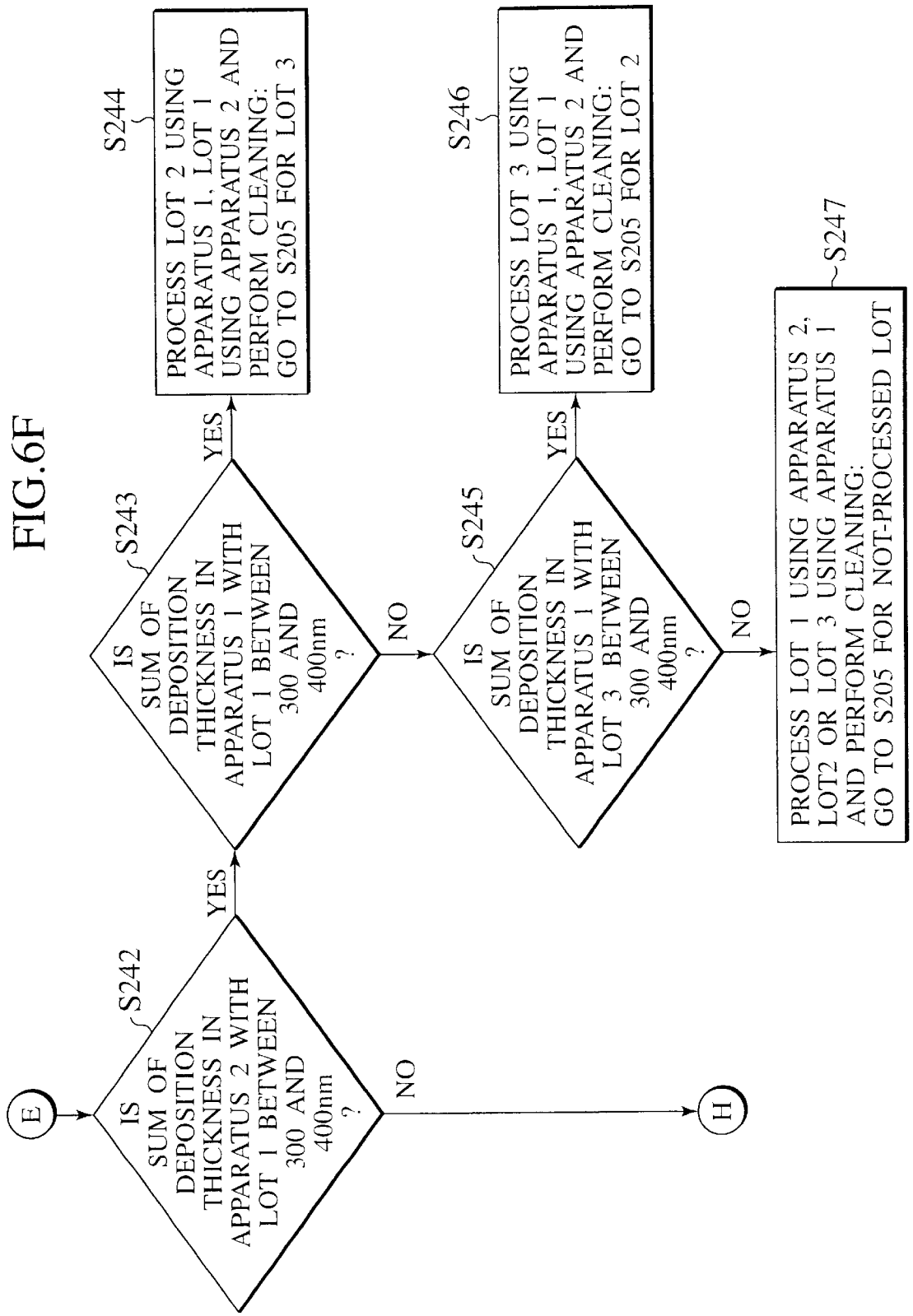
Figure 6H:
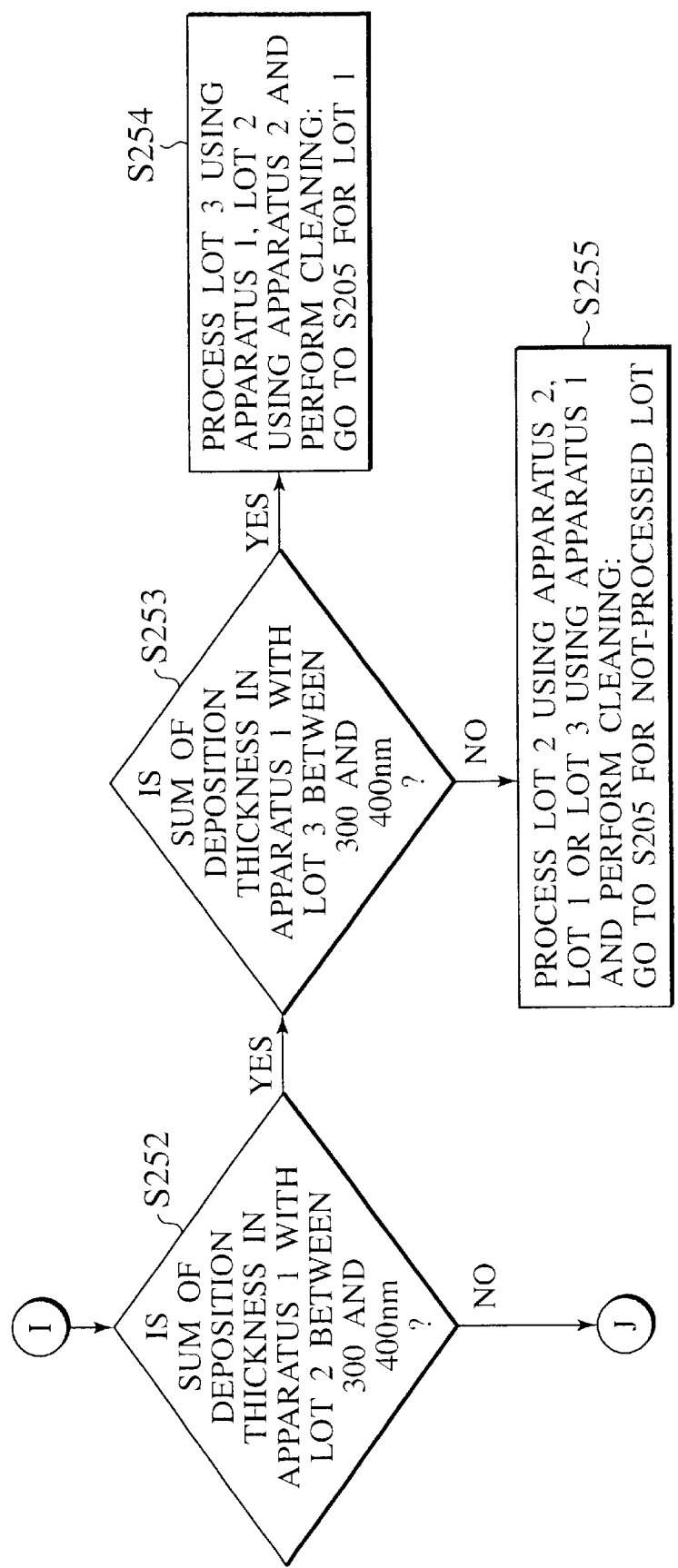
Figure 6I:
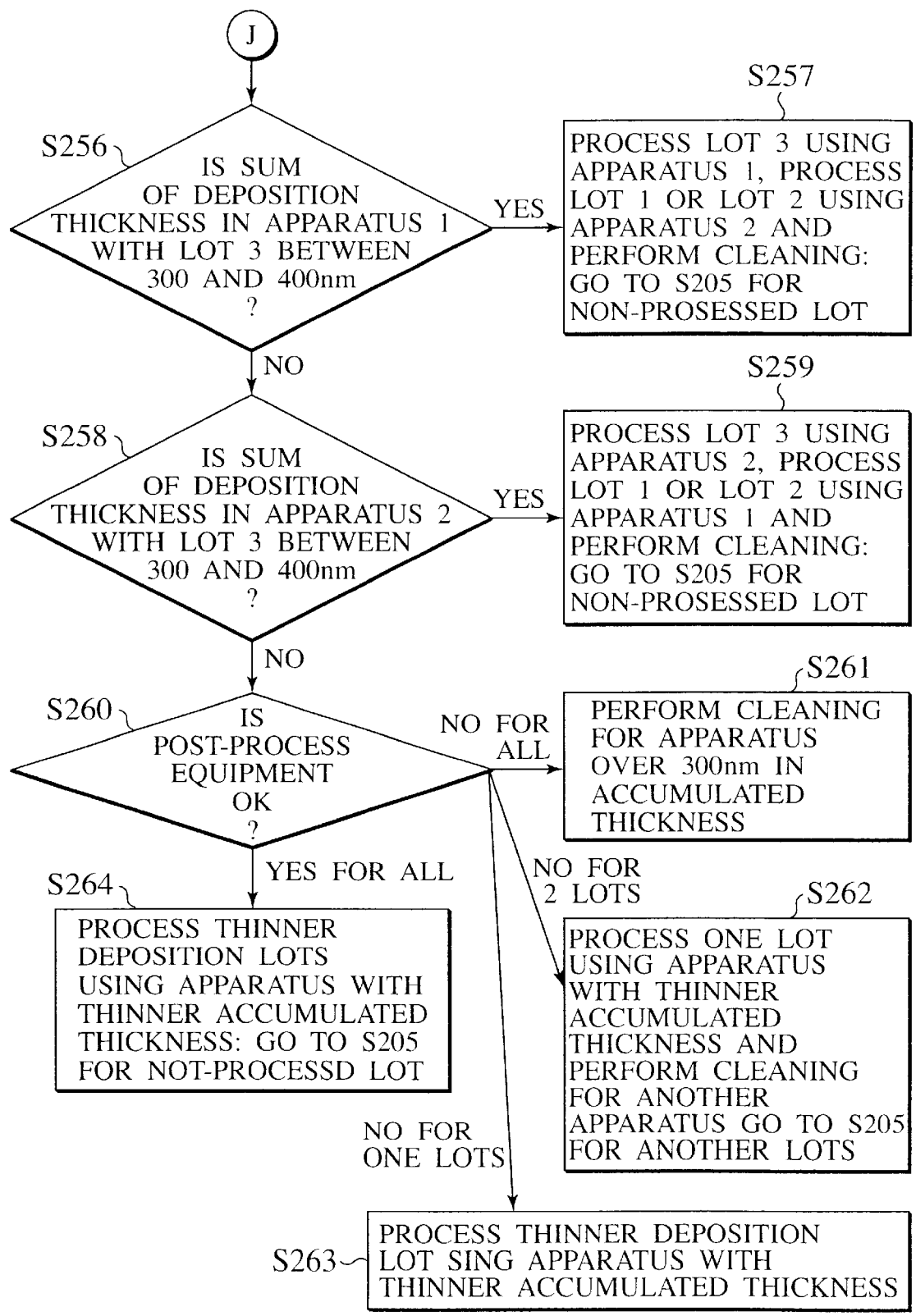

As shown in FIG. 2A, with the repetitive processing, almost no cracks occur on the surface of the quartz tip 1, whereas with the one-step processing, a number of micro cracks occur as shown in FIG. 2B. FIG. 3 shows average surface roughness (Ra) and peak-to-valley difference (P-V) values, which are measured macroscopically with a profiler, and microscopically with an atomic force microscope (AFM). In comparison with the respective values between the one-step processing and repetitive processing shown in FIG. 3, surface conditions with one-step processing becomes approximately ten times worse than those with repetitive processing.

In addition, as for weight variation in the quartz tip 1, weight decreases approximately 1.8 mg with the one-step processing, whereas with the repetitive processing weight decreases by 0.2 mg. The weight variation is suppressed and it may be conjectured that damage to the quartz tip 1 can be smaller.

Thus, according to the dry cleaning method shown here, in the case of the CVD chamber components, in particular when using quartz parts, damage to the quartz parts can be smaller and the quartz parts replacement cycle becomes longer. Normally, the quartz parts such as boats and tubes, which are replaced around every three months, may be used for several years. Accordingly, COO is drastically reduced, and an actual running time of the LPCVD apparatus gets longer since a maintenance cycle becomes longer, and a film deposition processing ability of the LPCVD apparatus is also improved.

In addition, by performing film deposition in conditions where there are few micro cracks on the quartz parts, dust caused by the micro cracks is reduced and processing yield is improved.

Such phenomena where cracks occur on the quartz parts are thought to be due to the coefficient of thermal expansion (CTE) of the quartz parts used for the CVD chamber components being greatly different from the CTE of the $Si_3N_4$ film since these cracks on the quartz parts occur similar to the cracks occurring on the $Si_3N_4$ film in the case where the $Si_3N_4$ film deposition thickness exceeds a fixed value.

In the first embodiment, it is possible to make an efficient determination whether the semiconductor wafer process may be immediately performed or it is necessary to perform the dry cleaning on the LPCVD apparatus.

Next, a semiconductor manufacturing system of the first embodiment is described referring to FIG. 4 and FIGS. 5A–5D. As shown in FIG. 4, in the semiconductor manufacturing system, a computer integrated manufacturing system (CIM) 52, a plurality of manufacturing apparatuses 66a, 66b, 66c, . . . , a plurality of apparatus controllers 65a, 65b, 65c, . . . attached to the apparatuses 66a, 66b, 66c, . . . , a lot information input terminal 67 and a quality control (QC) system 68 are combined through a local area network (LAN) 51.

In the CIM 52, a cleaning determination unit 53, an apparatus information storage unit 61, a lot information storage unit 62, and a host computer 60 are combined through the LAN 51. The cleaning determination unit 53 includes an information input module 54, an apparatus decision module 55, a timing determination module 56 and an output module 57. The apparatus information storage unit 61 stores an apparatus information database and the lot information storage unit stores a lot information database.

The apparatus information such as the accumulated deposition thickness of the deposited film, the condition of the manufacturing apparatus 66a, 66b, 66c, . . . , and the condition of the incidental facilities of the manufacturing apparatus 66a, 66b, 66c, . . . , is stored in the apparatus information database of the apparatus information storage unit 61. The lot information such as the process conditions, the deposition film thickness, an expected lot arrival timing, an urgent lot interrupting the current process and a condition for post-process, are stored in the lot information database of the lot information storage unit 62. The information input module 54 reads in the apparatus information and the lot information from the apparatus information database and the lot information database, respectively. The apparatus decision module 55 decides whether one of the selected manufacturing apparatus 66a, 66b, 66c, . . . , is appropriate for processing a current lot according to the information from the information input module 54. If not, apparatus decision module 55 decides, for the one of the manufacturing apparatus 66a, 66b, 66c, . . . , whether it is appropriate for performing the dry cleaning or performing a maintenance of incidental facilities, based on the information from the information input module 54. The timing determination module 56 determines timing for processing the current lot according to the apparatus decision module 55. In the case not to process the current lot, the timing determination module 56 determines timing for performing the dry cleaning or performing the maintenance of the incidental facilities, according to the apparatus decision module 55. The output module 57 obtains decided and determined information from the apparatus decision module 55 and the timing determination module 56. Then, the output module 57 sends the decided and determined information to the apparatus controllers 65a, 65b, 65c, . . . controlling the manufacturing apparatuses 66a, 66b, 66c, . . . through the LAN 51. The apparatus controllers 65a, 65b, 65c, . . . display on display units descriptions for next or following procedures sent from the cleaning determination unit 53 and controls instructed processes.

The cleaning determination unit 53 enables each of manufacturing apparatuses 66a, 66b, 66c, . . . , such as $Si_3N_4$ LPCVD apparatus, poly-silicon (poly-Si) LPCVD apparatus, $SiO_2$ LPCVD apparatus, to perform dry cleaning with the appropriate timing after or before performing lot process so that the accumulated deposition thickness of the $Si_3N_4$ film, the poly-Si film, the $SiO_2$ film, and so on, does not exceed a preset value according to the information databases stored in the apparatus and lot information storage units 61, 62. The timing for the dry cleaning also is determined depending on such as the expected arrival of an urgent lot, conditions of incidental facilities of the manufacturing apparatuses 66a, 66b, 66c, . . . , such as a vacuum pump, and operational condition of a post-process apparatus scheduled to process the lot after the process of the manufacturing apparatuses 66a, 66b, 66c, . . .

It should be noted that in the first embodiment, the cleaning determination unit 53 is shown as an independent system from the host computer 60, however it is also possible that the host computer 60 or another computer in the CIM 52 merges a module executing the same function as the cleaning determination unit 53.

FIG. 5A through FIG. 5D show, as an example, flowcharts of the method for determining the time schedule when to perform film deposition, cleaning, or maintenance of incidental facilities in the case of processing a single lot. Here, a poly-Si or amorphous Si film deposition and a $Si_3N_4$ film deposition are performed by a single LPCVD apparatus 66a. It is noted that, in this example of the first embodiment, preset values are 400 nm for the $Si_3N_4$ film deposition and 6 μm for the poly-Si film deposition, respectively.

(a) To begin with, the apparatus decision module 55 checks whether the last process performed on the LPCVD apparatus 66a is a film deposition (S101), a dry cleaning (S102), or a maintenance of the incidental facility (S103), referring to the apparatus information database through the information input module 54. In the case the last process is the dry cleaning, then in Step S111, a scrubber operation is checked. If the last process does not correspond any case, an additional examination is done manually in Step S104.

(b) In the case the last process is the film deposition or the maintenance of the incidental facility, then, in Step S105, the last film deposition is checked whether it is a poly-Si film deposition. In the case the last film deposition is the poly-Si film deposition, then, in Step S106, the next lot is checked whether it is a $Si_3N_4$ film deposition. If the next lot is scheduled to be processed by the $Si_3N_4$ film deposition, in Step S110, the timing determination module 56 determines to perform a dry cleaning of the LPCVD apparatus 66a and, in Step S111, the scrubber operation is checked. If the next lot is scheduled to be processed by the poly-Si film deposition, in Step S107, the apparatus decision module 55 checks whether a sum of an accumulated deposition thickness in the LPCVD apparatus and a planned deposition thickness for the poly-Si film is below 6 μm. If the sum is not below 6 μm, then in Step S108, the dry cleaning of the LPCVD apparatus 66a is performed. If the sum is below 6 μm, in Step S111, the scrubber operation is checked.

(c) In the case the last film deposition is not the poly-Si film deposition, in Step S109, the next lot is checked whether it is scheduled to be processed by the $Si_3N_4$ film deposition. If the next lot is not scheduled to be processed by the $Si_3N_4$ film deposition, in Step S110, the dry cleaning of the LPCVD apparatus 66a is performed and in Step S111, the scrubber operation is checked.

(d) In Step S111, the scrubber does not operate normally, then, the scrubber maintenance is performed in Step S112.

(e) In Step S113, an operation of a vacuum pump in the LPCVD apparatus 66a is checked. If the vacuum pump does not operate normally and alarm a warning, maintenance operation of the vacuum pump is performed in Step S114.

(f) In Step S115, a natural phenomenon is checked. If the natural phenomenon such as weather conditions affects a motor power of the vacuum pump, an additional examination is done manually in Step S116.

(g) In Step S117, the deposition thickness for the next lot is checked. If the planned deposition thickness is over 400 nm, then, an additional examination is done manually in Step S118.

(h) In Step S119, the apparatus decision module 55 checks whether an urgent lot is interrupting the current lot before the film deposition for the current lot. If the urgent lot is arriving, the urgent lot is assigned as the current lot. In Step S120, if the sum of the accumulated deposition thickness and the planned deposition thickness of the $Si_3N_4$ film deposition for the urgent lot is below 400 nm, the urgent lot is processed in Step S121. If the sum is not below 400 nm, in Step S122, the dry cleaning of the LPCVD apparatus 66a is performed and in Step S121, the urgent lot is processed.

(i) In Step S123, if the sum of the accumulated deposition thickness and the deposition thickness of the $Si_3N_4$ film deposition assigned as the current lot is not below 400 nm, the dry cleaning of the LPCVD apparatus 66a is performed in Step S124.

(j) In Step S125, a post-process apparatus is checked whether it is working normally. If the post-process apparatus is not normally working, in Step S126, the accumulated deposition thickness is checked whether it is over 300 nm. If the accumulated deposition thickness is over 300 nm, the dry cleaning of the LPCVD apparatus 66a is performed in Step S127 and the sequence returns to Step S119. If the accumulated deposition thickness is not over 300 nm, the $Si_3N_4$ film deposition is performed in Step S128.

(k) In Step S129, if the accumulated deposition thickness is not over 300 nm, the $Si_3N_4$ film deposition is performed in Step S133. If the accumulated deposition thickness is over 300 nm, it is decided, in Step S130, that there is enough time to perform the dry cleaning after the $Si_3N_4$ film deposition until the next lot arrives. If there is enough time, then, in Step S131, the $Si_3N_4$ film deposition is performed and continuously the dry cleaning is performed. If there is not enough time, In Step S132, only the $Si_3N_4$ film deposition is performed.

By making a decision on performing the film deposition or the dry cleaning according to the flowcharts shown in FIGS. 5A to 5D, it is possible to make efficient use of a manufacturing apparatus that is free from mistakes and excluding the human factor. Also, manpower may be reduced since there is no human intervention.

With the first embodiment of the present invention, it is shown that damage to the quartz components used in the CVD chamber may be avoided by performing the dry cleaning as long as the accumulated deposition thickness is lower than the preset value. And the cleaning determination unit 53 automatically determines when to perform the dry cleaning and the film deposition, according to the production flow condition of the lot, the condition of incidental facilities of the apparatus, and other information.

Second Embodiment

The diagrams shown in FIGS. 6A–6I are of LPCVD apparatuses 66a and 66b for $Si_3N_4$ film deposition, and show an example of the flowcharts for determining whether to perform the film deposition or a dry cleaning in the case of processing a plurality of lots. Here, a case requiring processing of three lots (lot 1, lot 2 and lot 3) arriving simultaneously at the LPCVD apparatuses 66a, 66b (apparatus 1 and apparatus 2) are assumed. The flowcharts for determining the LPCVD apparatuses 66a, 66b to perform the film deposition or the dry cleaning and the lot to be processed requires that a preset value of the accumulated deposition thickness does not exceed 400 nm as a basic condition. And by accurately acquiring the accumulated deposition thickness of each of the LPCVD apparatuses 66a, 66b, it is possible to effectively assign lots that will arrive in a short time in response to the film thickness. In addition, by predicting the post-process apparatus condition, a lot arrival, maintenance of the LPCVD apparatuses 66a, 66b and the incidental facilities of the LPCVD apparatus 66a, 66b, it is possible to perform the dry cleaning without missing the timing of instances where the LPCVD apparatuses 66a, 66b having a certain degree of the accumulated deposition thickness is not being used for the film deposition. Thus, it is possible to manage the LPCVD apparatuses 66a, 66b efficiently and to process the plurality of the lots smoothly.

(a) To begin with, in Step S201, S202, or S203, the cleaning determination unit 53 decide whether the last process in the LPCVD apparatus 66a, 66b is a film deposition, a dry cleaning or maintenance of the incidental facility in the LPCVD apparatuses 66a, 66b. If the last process is the film deposition or the dry cleaning, the next sequence of the process goes to Step S205. If the last process is the maintenance of the incidental facility of the LPCVD apparatus 66a, 66b, the next sequence goes to Step S209. If the last process does not correspond any case, an additional examination is done manually in Step S204.

(b) In Step S205, the scrubber does not operate normally, then, the scrubber maintenance is performed in Step S206.

(c) In Step S207, operation of vacuum pumps in the LPCVD apparatuses 66a, 66b is checked. If the vacuum pump does not operate normally and alarm a warning, maintenance of the vacuum pump is performed in Step S208.

(d) In Step S209, a natural phenomenon is checked. If the natural phenomenon such as weather conditions affects a motor power of the vacuum pumps, an additional examination is done manually in Step S210.

(e) In Step S211, a planned deposition thickness of a next lot is checked. If the planned deposition thickness is over 400 nm, then, an additional examination is done manually in Step S212.

(f) In Step S213, an arrival of an urgent lot interrupting the current lots is checked. If there is the urgent lot arriving, in Step S214, sums of accumulated deposition thickness in the LPCVD apparatuses 66a, 66b and the planned deposition thickness of the $Si_3N_4$ film are checked. The sums for both LPCVD apparatuses 66a, 66b exceed 400 nm, then, in Step S215, the dry cleaning are performed for both LPCVD apparatuses 66a, 66b.

(g) In Step S216, the LPCVD apparatus 66a is checked the sum of the accumulated deposition thickness and the planned deposition thickness of $Si_3N_4$ film and if the sum is between 300 and 400 nm, then, in Step S229, the LPCVD apparatus 66b is checked the sum of the accumulated deposition thickness and the planned deposition thickness of $Si_3N_4$ film. If the sum for the LPCVD apparatus 66b exceeds 400 nm, the urgent lot is processed in the LPCVD apparatus 66a and, thereafter the dry cleaning is performed for the LPCVD apparatus 66a in Step S231. If the sum for the LPCVD apparatus 66b is between 300 and 400 nm and the accumulated deposition thickness is decided in Step S230 being thinner in the LPCVD apparatus 66a than the LPCVD apparatus 66b, the urgent lot is processed in the LPCVD apparatus 66a and, thereafter the dry cleaning is performed for the LPCVD apparatus 66a in Step S231. If the accumulated deposition thickness is thinner in the LPCVD apparatus 66b, the urgent lot is processed in the LPCVD apparatus 66b and, thereafter the dry cleaning is performed for the LPCVD apparatus 66b in Step S232.

(h) In Step S216, the LPCVD apparatus 66a is checked the sum of the accumulated deposition thickness and the planned deposition thickness of $Si_3N_4$ film and if the sum is not between 300 and 400 nm, then, in Step S217, the LPCVD apparatus 66b is checked the sum of the accumulated deposition thickness and the planned deposition thickness of $Si_3N_4$ film. If the sum for the LPCVD apparatus 66b is between 300 and 400 nm, the urgent lot is processed in the LPCVD apparatus 66b and, thereafter the dry cleaning is performed for the LPCVD apparatus 66b in Step S218.

(i) If the sums for the LPCVD apparatuses 66a, 66b are not over 300 nm, instep S219, the accumulated deposition thickness is compared between the LPCVD apparatus 66a, and 66b. If the LPCVD apparatus 66a is thinner in the accumulated deposition thickness, then in Step S220, the urgent lot is processed using the LPCVD apparatus 66a, and if the LPCVD apparatus 66b is thinner in the accumulated deposition thickness, then in Step S221, the urgent lot is processed using the LPCVD apparatus 66b.

(j) In the case that there is no urgent lot, then the condition of the post-process apparatus for each lot are checked in Step S222. If all of the post-process apparatuses work normally, the next sequence of the process goes to Step S226. If not all in the post-process apparatuses work normally, each post-process apparatus is checked in Step S223. If all post-process apparatuses do not work normally, then the accumulated deposition thickness in the LPCVD apparatuses 66a, 66b are checked. For another case, the sequence for the process goes to Step S226. If the accumulated deposition thickness in both LPCVD apparatuses 66a, 66b does not exceed 200 nm, then both LPCVD apparatuses 66a, 66b are in standby, in Step S225. If one of the LPCVD apparatus 66a or 66b exceeds 200 nm in the accumulated deposition thickness, it is decided whether the dry cleaning is possible until the next lot arrives. If it is possible, in Step S234, the dry cleaning is performed for the one of the LPCVD apparatus 66a or 66b. And if it is not possible, in Step S235, the one of the LPCVD apparatus 66a or 66b is being in standby.

(k) In Step S226, the sums of the accumulated deposition thickness and the deposition thickness for every combination of the lots and the LPCVD apparatuses 66a, 66b are checked. If the sums for both LPCVD apparatuses 66a, 66b exceed 400 nm, then, in Step S227, the dry cleaning is performed for both LPCVD apparatuses 66a, 66b. If the sum in one of the LPCVD apparatus 66a or 66b is below 400 nm and the sum in another LPCVD apparatus 66a or 66b exceeds 400 nm, then, in Step S228, the sequence of the process for the one of the LPCVD apparatus 66a or 66b goes to Step S236 and the dry cleaning is performed for the another LPCVD apparatus 66a or 66b.

(l) In Step S236, the sum of the accumulated deposition thickness and the planned deposition thickness of the $Si_3N_4$ film with the combination of the LPCVD apparatus 66a and the lot 1 is checked. If the sum of the thickness with the combination of the LPCVD apparatus 66a and the lot 1 is between 300 and 400 nm, then in Step S237 the sum of the thickness with the combination of the LPCVD apparatus 66b and the lot 2 is checked. If the sum of the thickness with the combination of the LPCVD apparatus 66b and the lot 2 is between 300 and 400 nm, in Step S238 the $Si_3N_4$ film deposition of the lot 1 and the lot 2 are processed using the LPCVD apparatus 66a, and 66b respectively, and thereafter, the dry cleaning is performed for both LPCVD apparatuses 66a, 66b. The lot 3 for which the $Si_3N_4$ film deposition is not processed returns to Step S205. If the sum of the thickness with the combination of the LPCVD apparatus 66b and the lot 2 is not between 300 and 400 nm, in Step S239 the sum of the thickness with the combination of the LPCVD apparatus 66b and the lot 3 is checked. If the sum of the thickness with the combination of the LPCVD apparatus 66b and the lot 3 is between 300 and 400 nm, in Step S240 the $Si_3N_4$ film deposition of the lot 1 and the lot 3 are processed using the LPCVD apparatuses 66a and 66b respectively and, thereafter, the dry cleaning is performed for both LPCVD apparatuses 66a, 66b. The lot 2 for which the $Si_3N_4$ film deposition is not processed returns to Step S205. If the sum of the thickness with the combination of the LPCVD apparatus 66b and the lot 3 is not between 300 and 400 nm, in Step S241 the $Si_3N_4$ film deposition is processed for the lot 1 using the LPCVD apparatus 66a, and for the lot 2 or lot 3 whichever has thinner deposition thickness, using the LPCVD apparatus 66b and, thereafter, the dry cleaning is performed for both LPCVD apparatuses 66a, 66b. The sequence of the lot for which the $Si_3N_4$ film deposition is not processed returns to Step S205.

(m) If the sum of the accumulated deposition thickness and the planned deposition thickness of the $Si_3N_4$ film with the combination of the LPCVD apparatus 66a and the lot 1 is not between 300 and 400 nm, in Step S242 the sum of the thickness with the combination of the LPCVD apparatus 66b and the lot 1 is checked. If the sum of the thickness with the combination of the LPCVD apparatus 66b and the lot 1 is between 300 and 400 nm, then in Step S243 the sum of the thickness with the combination of the LPCVD apparatus 66a and the lot 2 is checked. If the sum of the thickness with the combination of the LPCVD apparatus 66a and the lot 2 is between 300 and 400 nm, in Step S244 the $Si_3N_4$ film deposition of the lot 1 and the lot 2 are processed using the LPCVD apparatus 66b and 66a, respectively, and thereafter, the dry cleaning is performed for both LPCVD apparatuses 66a, 66b. The lot 3 for which the $Si_3N_4$ film deposition is not processed returns to Step S205. If the sum of the thickness with the combination of the LPCVD apparatus 66a and the lot 2 is not between 300 and 400 nm, in Step S245 the sum of the thickness with the combination of the LPCVD apparatus 66a and the lot 3 is checked. If the sum of the thickness with the combination of the LPCVD apparatus 66a and the lot 3 is between 300 and 400 nm, in Step S246 the $Si_3N_4$ film deposition of the lot 1 and the lot 3 are processed using the LPCVD apparatus 66b and 66a, respectively, and, thereafter, the dry cleaning is performed for both LPCVD apparatuses 66a, 66b. The lot 2 for which the $Si_3N_4$ film deposition is not processed returns to Step S205. If the sum of the thickness with the combination of the LPCVD apparatus 66a and the lot 3 is not between 300 and 400 nm, in Step S247 the $Si_3N_4$ film deposition is processed for the lot 1 using the LPCVD apparatus 66b, and for the lot 2 or lot 3 whichever has thinner deposition thickness, using the LPCVD apparatus 66a and, thereafter, the dry cleaning is performed for both LPCVD apparatuses 66a, 66b. The sequence of the lot for which the $Si_3N_4$ film deposition is not processed returns to Step S205.

(n) If the sum of the accumulated deposition thickness and the planned deposition thickness of the $Si_3N_4$ film with the combination of the LPCVD apparatus 66b and the lot 1 is not between 300 and 400 nm, in Step S248 the sum of the thickness with the combination of the LPCVD apparatus 66a and the lot 2 is checked. If the sum of the thickness with the combination of the LPCVD apparatus 66a and the lot 2 is between 300 and 400 nm, then in Step S249 the sum of the thickness with the combination of the LPCVD apparatus 66b and the lot 3 is checked. If the sum of the thickness with the combination of the LPCVD apparatus 66b and the lot 3 is between 300 and 400 nm, in Step S250 the $Si_3N_4$ film deposition of the lot 2 and the lot 3 are processed using the LPCVD apparatus 66a and 66b, respectively and, thereafter, the dry cleaning is performed for both LPCVD apparatuses 66a, 66b. The lot 1 for which the $Si_3N_4$ film deposition is not processed returns to Step S205. If the sum of the thickness with the combination of the LPCVD apparatus 66b and the lot 3 is not between 300 and 400 nm, in Step S251 the $Si_3N_4$ film deposition is processed for the lot 2 using the LPCVD apparatus 66a, and for the lot 1 or lot 3 whichever has thinner deposition thickness, using the LPCVD apparatus 66b and, thereafter, the dry cleaning is performed for both LPCVD apparatuses 66a, 66b. The sequence of the lot for which the $Si_3N_4$ film deposition is not processed returns to Step S205.

(o) If the sum of the accumulated deposition thickness and the planned deposition thickness of the $Si_3N_4$ film with the combination of the LPCVD apparatus 66a and the lot 2 is not between 300 and 400 nm, in Step S252 the sum of the thickness with the combination of the LPCVD apparatus 66b and the lot 2 is checked. If the sum of the thickness with the combination of the LPCVD apparatus 66b and the lot 2 is between 300 and 400 nm, then in Step S253 the sum of the thickness with the combination of the LPCVD apparatus 66a and the lot 3 is checked. If the sum of the thickness with the combination of the LPCVD apparatus 66a and the lot 3 is between 300 and 400 nm, in Step S254 the $Si_3N_4$ film deposition of the lot 2 and the lot 3 are processed using the LPCVD apparatus 66b and 66a, respectively and, thereafter, the dry cleaning is performed for both LPCVD apparatuses 66a, 66b. The lot 1 for which the $Si_3N_4$ film deposition is not processed returns to Step S205. If the sum of the thickness with the combination of the LPCVD apparatus 66a and the lot 3 is not between 300 and 400 nm, in Step S255 the $Si_3N_4$ film deposition is processed for the lot 2 using the LPCVD apparatus 66b, and for the lot 1 or lot 3 whichever has thinner deposition thickness, using the LPCVD apparatus 66a and, thereafter, the dry cleaning is performed for both LPCVD apparatuses 66a, 66b. The sequence of the lot for which the $Si_3N_4$ film deposition is not processed returns to Step S205.

(p) If the sum of the accumulated deposition thickness and the planned deposition thickness of the $Si_3N_4$ film with the combination of the LPCVD apparatus 66b and the lot 2 is not between 300 and 400 nm, in Step S256 the sum of the thickness with the combination of the LPCVD apparatus 66a and the lot 3 is checked. If the sum of the thickness with the combination of the LPCVD apparatus 66a and the lot 3 is between 300 and 400 nm, then in Step S257 the $Si_3N_4$ film deposition is processed for the lot 3 using the LPCVD apparatus 66a, the lot 1 or lot 2 whichever has thinner deposition thickness, using the LPCVD apparatus 66b and thereafter, the dry cleaning is performed for each LPCVD apparatus. The sequence of the lot for which the $Si_3N_4$ film deposition is not processed returns to Step S205.

(q) If the sum of the accumulated deposition thickness and the planned deposition thickness of the $Si_3N_4$ film with the combination of the LPCVD apparatus 66a and the lot 3 is not between 300 and 400 nm, in Step S258 the sum of the thickness with the combination of the LPCVD apparatus 66b and the lot 3 is checked. If the sum of the thickness with the combination of the LPCVD apparatus 66b and the lot 3 is between 300 and 400 nm, then in Step S259 the $Si_3N_4$ film deposition is processed for the lot 3 using the LPCVD apparatus 66b, and for the lot 1 or lot 2 whichever has thinner deposition thickness, using the LPCVD apparatus 66a and, thereafter, the dry cleaning is performed for both LPCVD apparatuses 66a, 66b. The sequence of the lot for which the $Si_3N_4$ film deposition is not processed returns to Step S205.

(r) If the sum of the accumulated deposition thickness and the planned deposition thickness of the $Si_3N_4$ film with the combination of the LPCVD apparatus 66b and the lot 3 is not between 300 and 400 nm, in Step S260, the condition of the post-process apparatus for each lot is checked. In the case where all of the post-process apparatuses do not work normally, the dry cleaning is performed for the LPCVD apparatuses 66a, 66b having the accumulated deposition thickness over 300 nm. In the case where the post-process apparatus for a certain lot works normally, the process is performed for the certain lot using the LPCVD apparatus 66a, 66b having the thinnest accumulated deposition thickness and the sequence of other lots return to Step S205. If other LPCVD apparatus 66a or 66b has the accumulated deposition thickness over 300 nm, the dry cleaning is performed for the other LPCVD apparatus 66a or 66b. In the case where the post-process apparatuses for two certain lots work normally, the processes are performed for the two certain lots using the LPCVD apparatuses 66a, 66b assigning the lot having the thinner planned deposition thickness to the LPCVD apparatuses 66a, 66b having the thinner accumulated deposition thickness and the sequence of other lot return to Step S205. In the case where all of the post-process apparatus work normally, the processes are performed for the two lots having thinner planned deposition thickness among all lots, using the LPCVD apparatuses 66a, 66b assigning the lot having the thinner planned deposition thickness to the LPCVD apparatus having the thinner accumulated deposition thickness and the sequence of other lot return to Step S205.

Under conventional circumstances, it takes a lot of time for manual determination to assign manufacturing apparatuses 66a, 66b, 66c, . . . and lots to be processed. And it is almost impossible to make an accurate decision taking into consideration lots expected to arrive in the future, for the cleaning timing, and the maintenance timing of incidental facilities of the manufacturing apparatuses 66a, 66b, 66c, . . . Normally, although with the same condition for the manufacturing apparatuses 66a, 66b, 66c, . . . and the lots processing as the case mentioned above, it takes a lot of time for determining to assign the lot to one of the manufacturing apparatuses 66a, 66b, 66c, . . . , at the very least, only an acquisition of the current accumulated deposition thickness in the manufacturing apparatuses 66a, 66b, 66c, . . . and the planned deposition thickness of the lot scheduled for the film deposition. Due to those determinations not always being accurate, enormous time loss, lasting several tens of minutes in a day may actually occur. With the cleaning determination unit 53 according to the second embodiment, since such manual determination is never involved, accurate determination is possible and the time required for manual determination is replaced with merely a short computer calculation time.

Therefore, with the second embodiment, apparatus utilization becomes more efficient; processing ability of the apparatus is improved, and COO reduction is facilitated.

In the second embodiment, a method in the case where the film depositions for three lots are required for two manufacturing apparatuses 66a, 66b is described. Furthermore, in the case where there are more manufacturing apparatuses 66a, 66b, 66c, . . . or more lots, or even in the case when the manufacturing apparatuses 66a, 66b, 66c, . . . are shared for large variety of film deposition, it is possible to manage the manufacturing apparatuses 66a, 66b, 66c, . . . efficiently and process the lots smoothly.

In the second embodiment, it is possible to determine automatically and efficiently whether the semiconductor wafer process may be immediately performed or the dry cleaning may be necessary to perform on the manufacturing apparatus.

Third Embodiment

Figure 7:
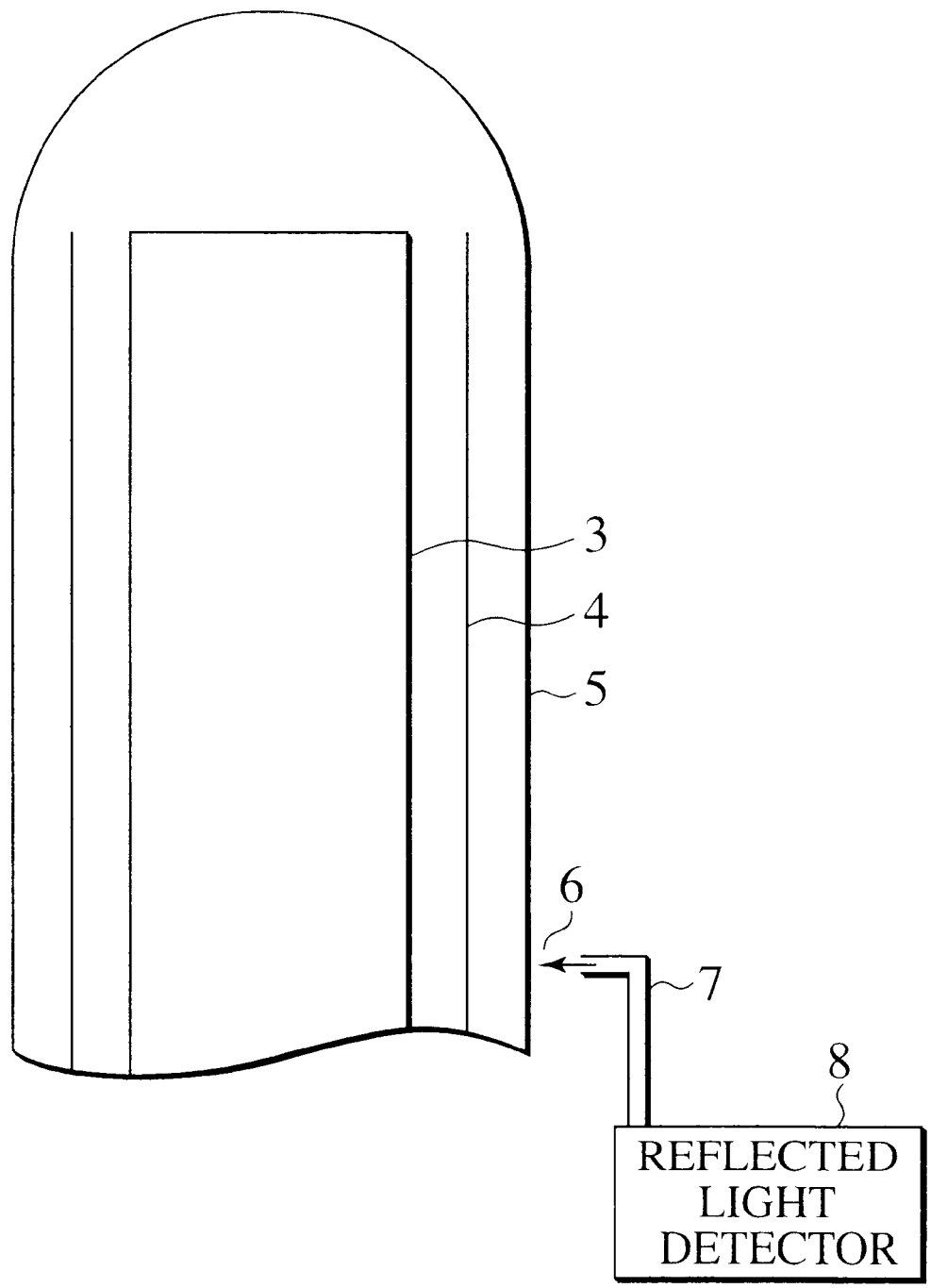
FIG. 7 is a schematic cross-sectional diagram illustrating a CVD chamber of an LPCVD apparatus describing cleaning end point detection according to a third embodiment of the present invention.

An LPCVD apparatus 66a, as shown in FIG. 7, includes a quartz outer tube 5 and quartz inner tube 4 that form a CVD chamber, and a quartz boat 3 is arranged in the inside of the quartz inner tube 4. In the third embodiment, a reflected light detector (laser light source) 8 is attached to the CVD chamber. The reflected light detector 8 includes optical fiber 7, and is disposed so that the laser light 6 from the optical fiber 7 is directed toward the inside of the CVD chamber. An end point where the $Si_3N_4$ deposited film in the CVD chamber is removed by the dry cleaning is detected by analyzing the reflection intensity of the laser light 6 emitted from the optical fiber 7. At the same time, a degree of the roughness on the quartz parts surface may be estimated.

In the third embodiment, it is possible to determine easily the end point for dry cleaning of the LPCVD apparatus 66a so that excessive etching to the CVD chamber components may be prevented.

Fourth Embodiment

Figure 8:
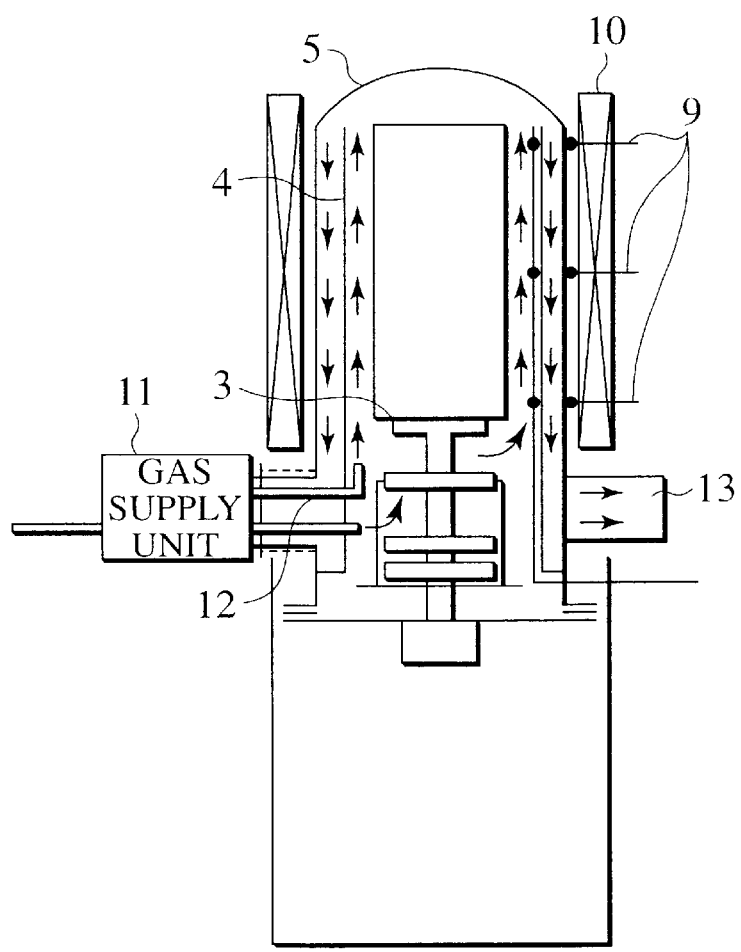
FIG. 8 is a schematic cross-sectional diagram of an LPCVD apparatus according to a fourth embodiment of the present invention.

An LPCVD apparatus 66a, as shown in FIG. 8, includes a quartz outer tube 5 and a quartz inner tube 4 that form a CVD chamber, and a quartz boat 3 is arranged in the inside of the quartz inner tube 4. A heater 10 provided with thermo couples 9 is arranged surrounding the CVD chamber. In addition, a gas supply unit 11 comprising a gas nozzle 12 having the tip thereof inserted into the CVD chamber is provided. An exhaust piping 13 is connected to the CVD chamber. With the fourth embodiment, a sample is arranged inside the quartz boat 3. A $Si_3N_4$ film is deposited in the CVD chamber using the CVD method, and the $Si_3N_4$ film is removed through etching by performing a dry cleaning with a cleaning gas. In the case of performing the dry cleaning of the $Si_3N_4$ film using conventional $ClF_3$ gas, dry cleaning conditions are;

cleaning temperature: 650° C.,
cleaning pressure: 200 Pa,
flow rate for $ClF_3$: 1200 sccm, and
flow rate for $N_2$: 2700 sccm.

Under these conditions, a $Si_3N_4$ etching rate of the $Si_3N_4$ film is approximately 300 nm/min.

Prior to the dry cleaning under these conditions, a titanium tetrachloride ($TiCl_4$) gas is introduced in order to form approximately 10 nm of a titanium (Ti) film upon the $Si_3N_4$ film in the CVD chamber. The etching rate of the $Si_3N_4$ film under the same conditions after forming the Ti film increase to 500 nm/min with the same evaluation. In this example of the fourth embodiment the etching rate is approximately 1.7 times faster than the conventional. This may be understood from the following causes: one that since the Ti metallic film works as a catalyst for the $ClF_3$, the $Si_3N_4$ film etched immediately after a Ti film etching should be rapidly etched; the other that since the Ti film is not always homogeneously etched, a rapid etching of the $Si_3N_4$ film starts at portions of exposed underlying $Si_3N_4$ film corresponding to thinner portion of the Ti film. In addition, for the $Si_3N_4$ film and a thermal $SiO_2$ film, selectivity in the case of not performing Ti film deposition is approximately 10, while, selectivity is improved to approximately 15 with Ti film deposition. Furthermore, it is thought that a similar catalytic reaction occurs through the simultaneous introduction of $TiCl_4$ and $ClF_3$ gas in the CVD chamber for the dry cleaning. As the result, the etching rate increases by approximately 200%, and the selectivity is improved approximately 150%.

Thus, in the example of the fourth embodiment, by performing the dry cleaning after the Ti thin film has been deposited, the etching rate is increased and cleaning time may be reduced, and in addition damage to the CVD chamber components due to over-etching may be avoided through the improvement of selectivity. Accordingly, an apparatus capacity is improved, and COO is reduced because of the reduction in the amount of gas used and reduction of component replacement frequency.

According to the example of the fourth embodiment, the cleaning selectivity is improved, and the dry cleaning is performed efficiently. In addition, an excessive etching to the CVD chamber components may be prevented.

According to an other example of the fourth embodiment, a dry cleaning using a cleaning gas including $ClF_3$ gas is performed on the deposited $Si_3N_4$ film that is deposited in the CVD chamber of the LPCVD apparatus 66a. The conventional dry cleaning conditions are the same as those of the example of the fourth embodiment. When performing dry cleaning under the conditions, a carbon monoxide (CO) gas is mixed into the $ClF_3$ gas. With the above-mentioned conditions, a flow rate of the CO gas to be added is 500 sccm.

The $Si_3N_4$ etching rate in this condition is approximately 500 nm/min, and the increase in etching rate and increase in selectivity similar to the case where $TiCl_4$ is added may be seen.

According to the other example of the fourth embodiment, the cleaning selectivity is improved, and the dry cleaning may be performed efficiently. In addition, an excessive etching of the CVD chamber components may be prevented.

Fifth Embodiment

In the fifth embodiment, a dry cleaning using a cleaning gas including a $ClF_3$ gas is performed on an amorphous Si film deposited in a CVD chamber of a manufacturing (LPCVD) apparatus 66a.

Prior to performing the dry cleaning, temperature in the CVD chamber is raised to 700° C., then an annealing is performed for five minutes. The deposited amorphous Si film is crystallized into the poly-Si film. Next, the CVD chamber is set to cleaning conditions, and the dry cleaning is performed.

The amorphous Si and poly-Si film cleaning conditions are; cleaning temperature: 600° C., cleaning pressure: 133 Pa, flow rate for $ClF_3$: 900 sccm, flow rate for $N_2$: 2500 sccm, respectively.

The etching rate is approximately 100 nm/min in the case of not performing annealing on the deposited film prior to performing the dry cleaning, whereas the etching rate is 250 nm/min in the case of performing the above mentioned annealing.

Figure 9A:
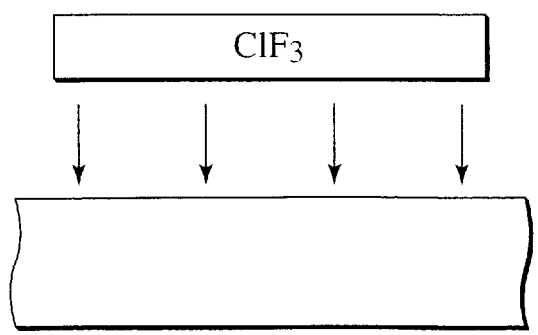
FIGS. 9A and 9B are cross-sectional diagrams describing for etching silicon deposition films according to a fifth embodiment of the present invention.
Figure 9B:
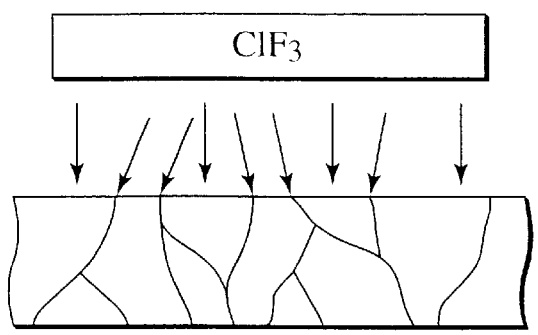

This is because, since the amorphous Si film is a film not containing crystal grains as shown in FIG. 9A, the etching proceeds in order from the amorphous Si film surface layer; whereas, when crystal grains are generated according to performing the anneal as shown in FIG. 9B, the etching gas goes through gaps of the crystal grains and the etching begins from there.

Typically, approximately 10 $\mu$m of deposited film is removed. While conventionally it takes two hours or more including over-etching time, it can be suppressed within one hour, for the dry cleaning according to the fifth embodiment, resulting in an improvement in the operational capacity of the manufacturing apparatus, the amount of gas used may be reduced resulting in a reduction of COO.

According to the fifth embodiment, the dry cleaning is efficiently performed for the amorphous Si deposition film.

Sixth Embodiment

Figure 10:
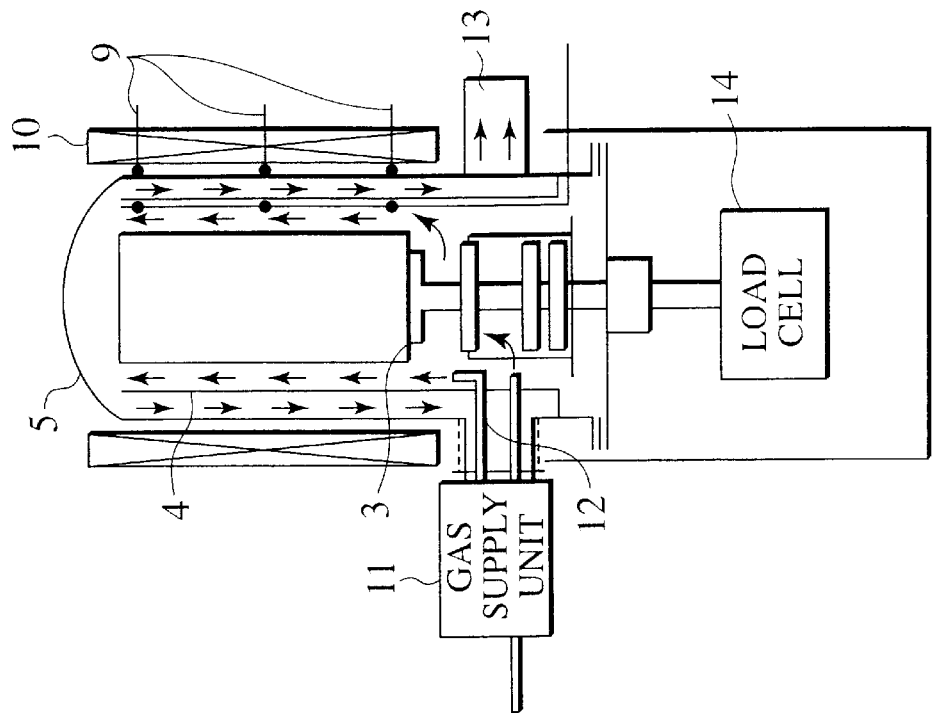
FIG. 10 is a schematic cross-sectional diagram of an LPCVD apparatus according to an example of an sixth embodiment of the present invention.

In an example of the sixth embodiment, a dry cleaning using a cleaning gas including a $ClF_3$ gas is performed on a tetraethylorthosilicate (TEOS) film that is deposited in a CVD chamber of the LPCVD apparatus 66a. The LPCVD apparatus 66a, as shown in FIG. 10, includes a quartz outer tube 5 and a quartz inner tube 4 that form the CVD chamber, and a quartz boat 3 is arranged in the inside of the quartz inner tube 4. A heater 10 provided with thermo couples 9 is disposed surrounding the CVD chamber. In addition, a gas supply unit 11 including a gas nozzle 12 inserted into the CVD chamber is provided. An exhaust piping 13 is connected to the CVD chamber. With the example according to the sixth embodiment, a sample is provided in the quartz boat 3. A load cell 14 for an electronic gravimetry, is provided in the quartz boat 3.

In the case of performing the dry cleaning of the TEOS film using the conventional $ClF_3$ gas, conditions are;
cleaning temperature: 600° C.,
cleaning pressure: 133 Pa,
flow rate for $ClF_3$: 1000 sccm, and
flow rate for $N_2$: 500 sccm.

An etching rate of the TEOS film by the dry cleaning is calculated from a weight variation of a semiconductor wafer deposited with a TEOS film loaded in the CVD chamber. The etching rate for the TEOS film is approximately 30 nm/min. In the example of the sixth embodiment, just prior to the dry cleaning using the $ClF_3$ gas, an $N_2$ gas including 20% of a water ($H_2O$) gas is introduced into the CVD chamber for five minutes at the same temperature and pressure as the above-mentioned cleaning conditions. Similarly, the etching rate of the TEOS film by the dry cleaning is estimated from the weight variation in the TEOS film on the semiconductor wafer loaded in the CVD chamber. The etching rate for the TEOS film in the example of the sixth embodiment is 50 nm/min.

Thus, it is possible to increase the etching rate by forming a moisture absorption layer on the TEOS film in advance and etching the TEOS film using the $ClF_3$ gas. This leads to a reduction in cleaning time, resulting in an improvement in the operating capacity of the LPCVD apparatus 66a, and the amount of gas used for the dry cleaning may be reduced resulting in a reduction of COO.

According to the example of the sixth embodiment, the cleaning selectivity is improved, and the dry cleaning is performed efficiently.

Figure 11:
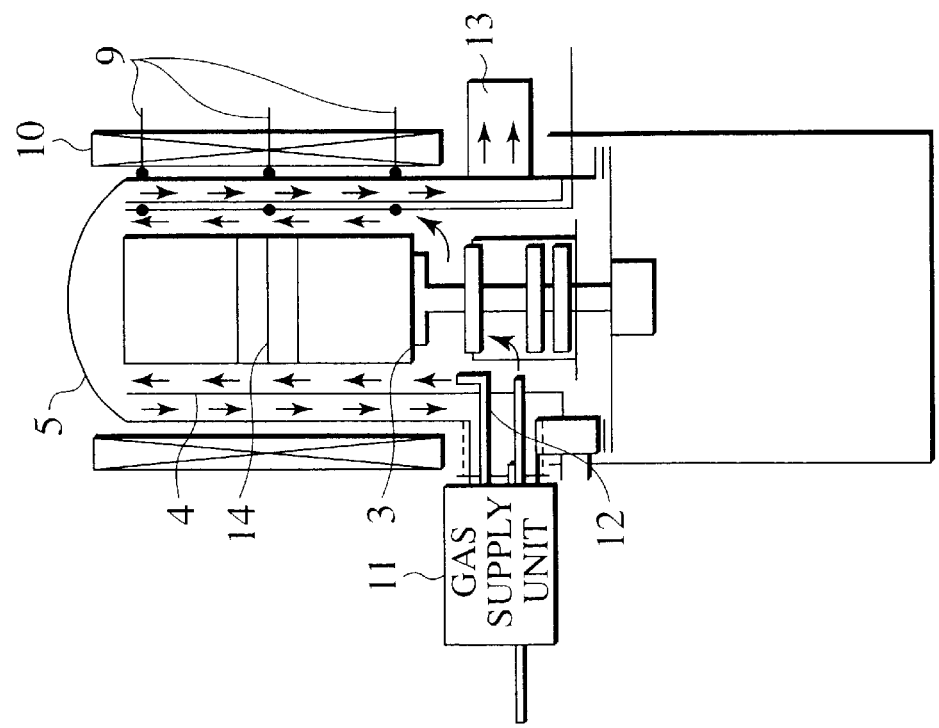
FIG. 11 is a schematic cross-sectional diagram of an LPCVD apparatus according to other example of the sixth embodiment of the present invention.
Figure 12:
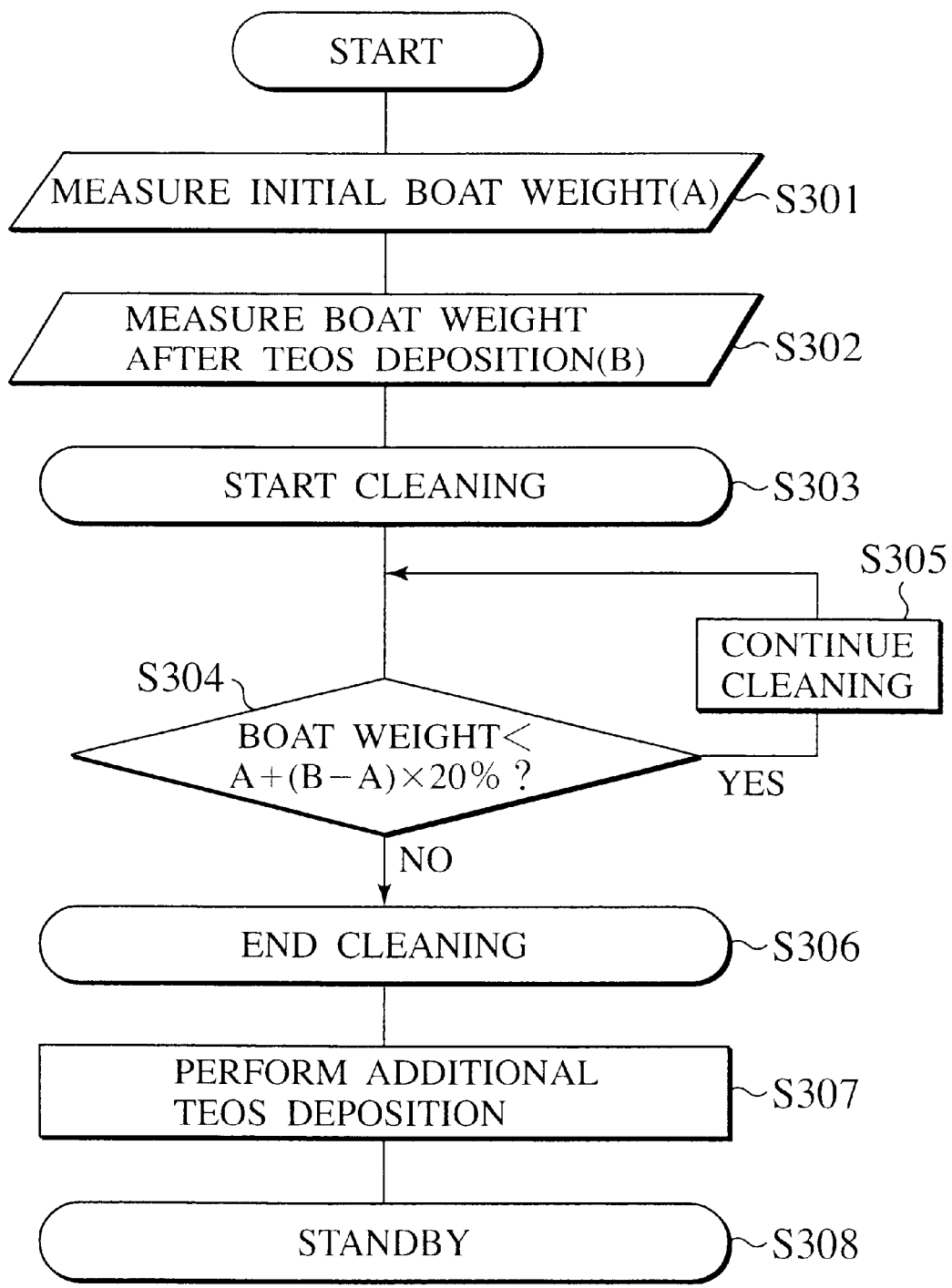
FIG. 12 is a cleaning end point detection flowchart diagram according to the other example of the sixth embodiment of the present invention.

FIG. 11 is a cross-sectional diagram of a vertical LPCVD apparatus 66a, and FIG. 12 is a cleaning end point detection flowchart, according to other example of the sixth embodiment. The dry cleaning is performed using the cleaning gas including $ClF_3$ gas for a TEOS film deposited in the CVD chamber of the LPCVD apparatus 66a. The LPCVD apparatus 66a includes a quartz outer tube 5 and quartz inner tube 4 that form the CVD chamber, and a quartz boat 3 is placed in the inside of the quartz inner tube 4. A heater 10 including thermo couples 9 is disposed surrounding the CVD chamber. In addition, a gas supply unit 11 includes a gas nozzle 12 inserted into the CVD chamber is provided. An exhaust piping 13 is connected to the CVD chamber. A semiconductor wafer is loaded in the quartz boat 3. According to the other example of the sixth embodiment, a load cell 14 is provided connecting outside at an exhaust end of the CVD chamber.

In the other example of the sixth embodiment, a method for performing cleaning end point detection is described using the flowchart shown in FIG. 12 by managing the TEOS film weight that has been pre-deposited upon CVD chamber components.

(a) In Step S301, a weight of the quartz boat 3 as an initial boat weight A is measured by the load cell 14. And the initial boat weight information is written in the apparatus information database stored in the apparatus information storage unit 61 managed under the CIM 52.

(b) In Step S302, a TEOS film deposition is performed in the CVD chamber to coat the quartz boat 3. A weight of the quartz boat 3 coated with the TEOS film as a coated boat weight B is measured by the load cell 14. And the deposited boat weight information is written in the apparatus information database stored in the apparatus information storage unit 61 managed under the CIM 52.

(c) After normal film depositions have been processed, in Step S303, the dry cleaning is performed measuring the weight of the quartz boat 3 in real time using the load cell 14.

(d) In Step S304, a weight decrease of the quartz boat 3 due to etching of the deposited film during the dry cleaning is measured in real-time and compared with the coated boat weight B. The point of time where the decrease in the weight on the remaining amount of the TEOS film exceeds 20% of the coated TEOS film weight, (B–A) is defined as the cleaning end point. In other word, the weight of the quartz boat corresponding to the cleaning end point under the dry cleaning, is defined as; A+(B–A)*20/100. In the case where the decrease in the measuring boat weight is below the weight of the cleaning end point, then in Step S305, the dry cleaning is continued.

(e) In the case where the decrease in the measuring boat weight exceeds the weight of the cleaning end point, then in Step S306, the dry cleaning is ended.

(f) In Step S307, the decreased amount of TEOS film in the coated boat weight B on the quartz boat 3 is recovered by an additional TEOS deposition, then in Step S308, the LPCVD apparatus 66a is in standby.

According to the other example of the sixth embodiment, it is possible to perform cleaning without yielding damages to the CVD chamber components with the dry cleaning and allowing the CVD chamber components to be used nearly indefinitely.

According to the other example of the sixth embodiment, an excessive etching to the CVD chamber components may be prevented. Also, since end point detection is performed effectively, it is possible to reduce cleaning time.

Seventh Embodiment

In the seventh embodiment of the present invention, a method for performing cleaning end point detection by managing the temperature of a poly-Si film deposited in advance upon the CVD chamber components in the LPCVD apparatus 66a is described.

As described in the fourth embodiment, as shown in FIG. 8, the thermo couples 9 are provided at portions along the quartz outer tube 5 on the top, middle, and bottom sides of the quartz boat 3 loading a semiconductor wafer in the CVD chamber. Temperature measured here is monitored in real time, and written as apparatus information on the apparatus information database stored in the apparatus information storage unit 61 managed under the CIM 52. By the method described here, the cleaning end point is detected according to the real-time temperature information.

Typically, a poly-Si film has a high reactivity with a $ClF_3$ gas, and an etching rate for the poly-Si film is higher than that for other types of film. Along with this high reactivity, heat is generated during etching, resulting in the temperature of the furnace rising higher than the setting temperature during cleaning. The point of time where the temperature rising temporarily decreases to the setting value is a cleaning end timing for the poly-Si film. For avoiding to yield damages in the CVD chamber components, the cleaning end timing may be set without etching the poly-Si film completely, at the point of time where a temperature rise is found at all thermo couples 9. For example, a cleaning end temperature is assigned to 2° C. higher than the cleaning setting temperature.

Figure 13:
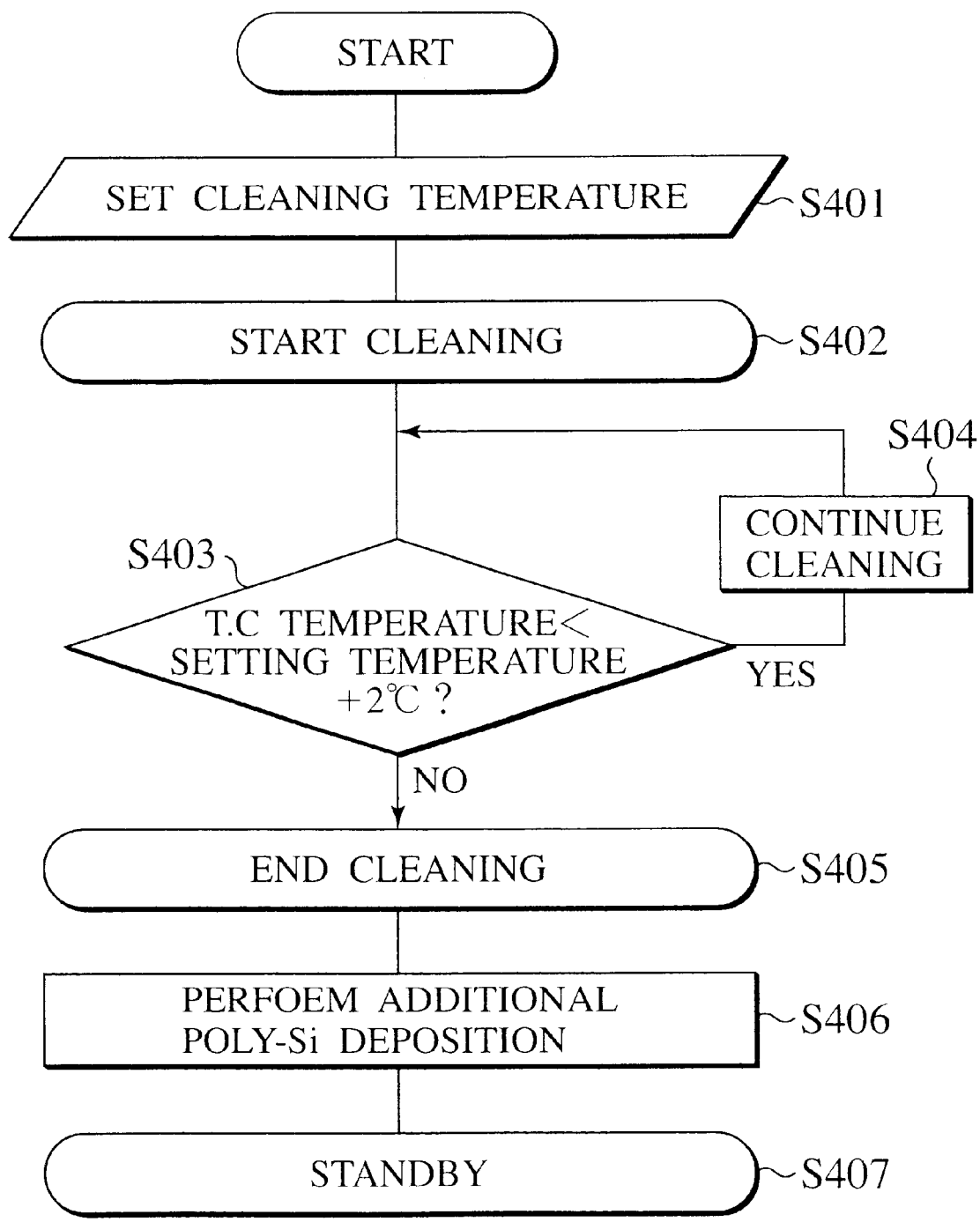
FIG. 13 is a cleaning end point detection flowchart diagram according to a seventh embodiment of the present invention.

(a) To begin with, as shown in FIG. 13, after a poly-Si film is deposited on the CVD chamber components, a deposition for other types of film is performed. Thereafter, in Step S401, the CVD chamber is heated up to a cleaning setting temperature for the dry cleaning using the heater 10.

(b) In Step S402, the dry cleaning is started with introducing a $ClF_3$ gas into the CVD chamber.

(c) In Step S403, temperatures of thermo couples 9 are monitored. In the case where all of the temperatures of the thermo couples 9 do not exceed the cleaning end temperature, then in Step S404, the dry cleaning is continued.

(d) In the case where all of the temperatures of the thermo couples 9 exceeds the cleaning end temperature, then in Step S404, the dry cleaning is ended.

(e) In Step S406, the decreased amount of the poly-Si film on the CVD chamber components is recovered by an additional poly-Si deposition, then in Step S407, the LPCVD apparatus is in standby.

For example, the dry cleaning is performed on 1 $\mu$m of a $Si_3N_4$ film that is deposited upon 3 $\mu$m of a deposited poly-Si film. Ten minutes into the dry cleaning that is performing under a cleaning temperature of 600° C., the temperature of the thermo couples 9 on the bottom side begins to rise, and within a minute after the beginning of the temperature rise, the temperature rise is found in all of the thermo couples 9. Then, after waiting for the same length of time, i.e., approximately one minute, all of the thermo couples 9 exceeds in the temperature of 602° C., and the dry cleaning is halted. The $Si_3N_4$ film on the poly-Si film is removed from all portions in the CVD chamber, and the poly-Si film remains partially. According to the method of the seventh embodiment, the cleaning end timing may be acquired with substantially pinpointed, and the dry cleaning does not yield damages to the CVD chamber components. In addition, the reduction in cleaning time leads to an improvement in apparatus capacity, and the minimization of cleaning gas consumption together with the reduction in component maintenance frequency lead to the reduction of COO.

In addition, it is possible to maintain conditions of a constant poly-Si film thickness by additionally depositing a poly-Si film where the poly-Si film thickness decreases after the dry cleaning. In particular, since over-etching may be minimized in the case where quartz parts are used as the CVD chamber components and $ClF_3$ is used as a cleaning gas, a surface roughness on the quartz parts is suppressed greatly, and since the maintenance frequency may be minimized, the apparatus capacitance is improved and COO is reduced.

Eighth Embodiment

Figure 14:
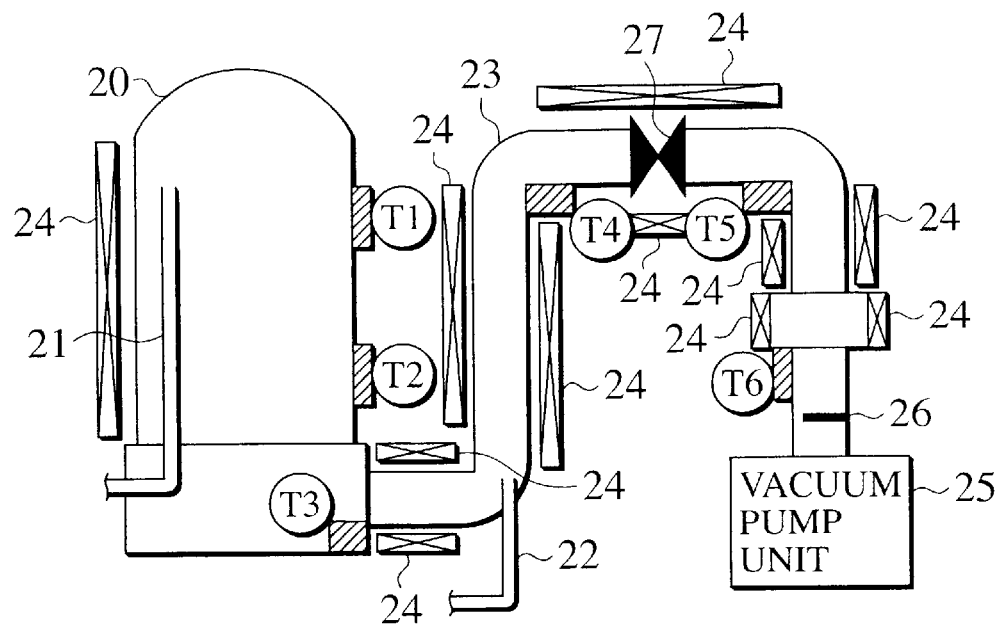
FIG. 14 is a schematic cross-sectional diagram of an LPCVD apparatus according to an eighth embodiment of the present invention.

In the LPCVD apparatus 66a, as shown in FIG. 14, an exhaust piping 23 is connected to a CVD chamber 20. A vacuum pump unit 25 is connected to one end of the exhaust piping 23. Gas nozzles 21 and 22, which supply gas from the outside, are connected to the CVD chamber 20 and upstream of the exhaust piping 23. Temperature control units 24 are disposed at the prescribed locations T1 through T6 of the CVD chamber 20 and the exhaust piping 23 in order to adjust the temperature at each location T1 through T6. The locations T1 through T3 are located upstream, downstream and at an exhaust port of the CVD chamber, the locations T4 and T5 are located upstream and downstream of a conductance control valve 27 in between the exhaust piping, and the location T6 is located upstream of a pressure control valve 26.

Under conditions where a Si film is attached to the inside of the CVD chamber 20, the dry cleaning is performed for the Si film attached in the CVD chamber 20 by supplying a $ClF_3$ gas through the gas nozzle 21. In each of the locations T1 through T6 shown in FIG. 14, temperature control is possible, wherein locations T1 and T2 are controlled at 400° C., location T3 is at 300° C., and locations T4 through T6 are at 150° C. at the start of the dry cleaning. The dry cleaning is performed under conditions where 900 sccm of $ClF_3$ and 1600 sccm of $N_2$ are flowed. Pressure in the CVD chamber 20 is kept steady at 6650 Pa using the conductance control valve 27. In addition, the pressure control valve 26 controls pressure in the exhaust piping at 1330 Pa, and pressure in an intake vent of the vacuum pump 25 is controlled at 665 Pa by reducing rotations of the vacuum pump unit 25 to be less than that in a normal deposition process.

Figure 15:
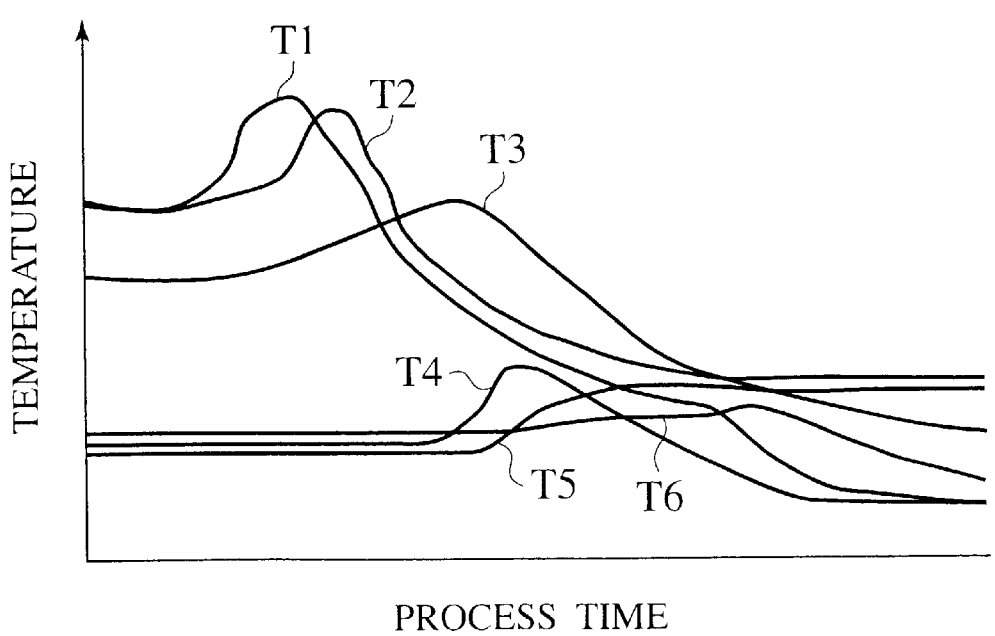
FIG. 15 is a graph illustrating temperature variation in each location of the LPCVD apparatus according to the eighth embodiment of the present invention.

FIG. 15 shows results of temperature measurements at each location of T1 through T6 during the above-mentioned dry cleaning process. At any of the locations, it can be seen that the temperature is higher than that initially controlled during the dry cleaning. This is because the reaction between $ClF_3$ and Si is an exothermal reaction. As the result, it is possible to determine that the deposited Si film at each location T1 through T6 has been etched based on the condition where the heat generation is not found by judging the results measured by a thermometer placed at each location T1 through T6. In FIG. 15, the time at which the maximum temperature is reached is delayed in order from T1 to T6, which corresponds to the fact that the dry cleaning proceeds from the upstream side of the $ClF_3$ gas flow. Since it is difficult to make correct determination of cleaning end timing at each location T1 through T6, it is defined that the dry cleaning ends at the point of time where the temperature at each location T1 through T6 rises and then falls to the initially controlled temperature. Thus, at the cleaning end timing, heating with an external heater at each location T1 through T6 is halted. As the result, as shown in FIG. 15, the temperature at each location T1 through T6 continuously falls until the point of time where the entire cleaning ends.

Thus, it is possible to avoid over-etching at the locations T1 through T6 by lowering the temperature after the dry cleaning ends.

In addition, after the dry cleaning ends at the location T3, conditions are set where only nitrogen is supplied by halting the supply of $ClF_3$ supplied through the gas nozzle 21, and supplying $ClF_3$ through the gas nozzle 22. As the result, it is possible to sufficiently avoid over-etching through not only the effects of lowering the temperature but also stopping the supply of etching gas at the locations of T1 through T3 where the cleaning has already ended.

In the locations of T4 through T6, over-etching at each location T4 through T6 may also be prevented by stopping heating at the location T4 through T6 after each cleaning end timing is determined and it is determined that the deposited film is removed. Accordingly, it is possible to avoid damages to the CVD chamber components and to perform the dry cleaning efficiently with monitoring the temperature at each location T1 through T6.

Figure 16:
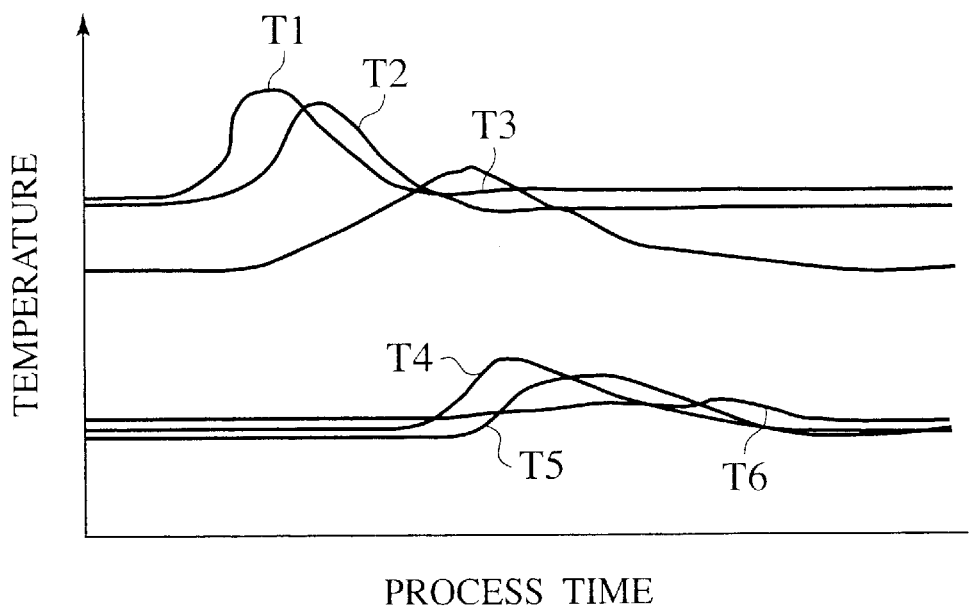
FIG. 16 is a graph illustrating temperature variation in each location of the LPCVD apparatus according to a conventional process.

In order to perform comparison, cleaning of the CVD chamber 20 and the exhaust piping 23 is similarly performed with the conventional process shown in FIG. 16 where the temperature is not changed after the dry cleaning at each location T1 through T6 ends. In this case, once the temperature rises for each location T1 through T6, thereafter over-etching should occur.

Actually, in order to examine how over-etching may be prevented by adopting a process according to the eighth embodiment of the present invention, the dry cleaning is performed with the respective processes shown in FIG. 15 and FIG. 16 by setting a quartz tip depositing an Si film with the same film thickness as the inside wall in the CVD chamber 20 at the location Ti. As a result of examining the quartz tip condition after the dry cleaning, no change is found in the quartz tip after the cleaning process shown in FIG. 15 according to the eighth embodiment. More specifically, the result of examining the roughness on the surface using AFM, Ra=2 nm, that is, there is no change. Nor is there a change in weight, since etching amount of quartz itself is less than the lower detection limit. Meanwhile, in the case of performing the dry cleaning with the conventional method shown in FIG. 16, after etching, the roughness on the surface of the quartz tip increases from Ra=2 nm to 4 nm, and etched amount of the quartz tip measured from the weight is estimated as 250 nm.

According to the eighth embodiment, since the cleaning end timing may be determined for each location of the LPCVD apparatus, it is possible to perform the appropriately sufficient cleaning, and it is possible to improve the dry cleaning efficiency and reduce process time.

Ninth Embodiment

Figure 17:
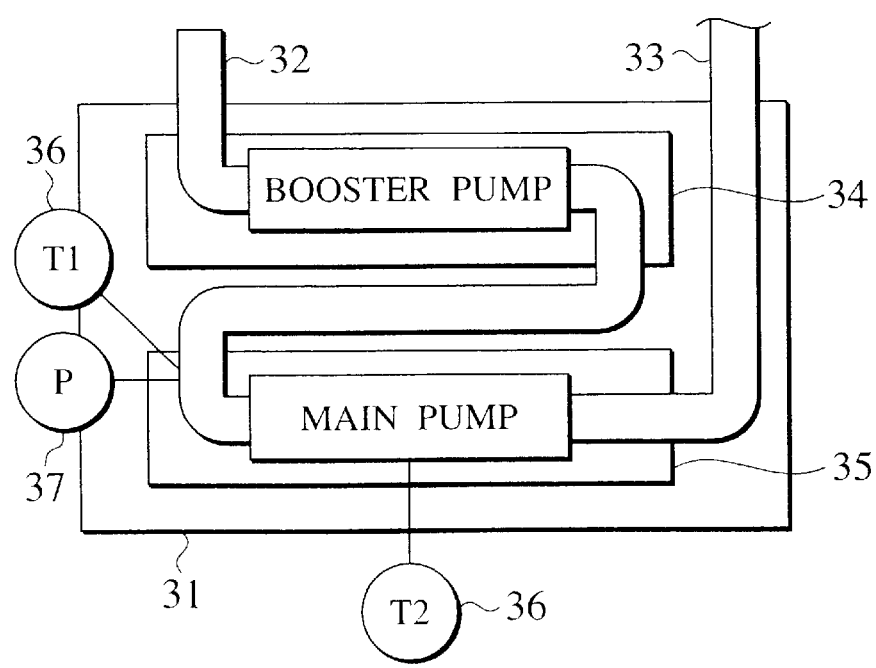
FIG. 17 is a schematic cross-sectional diagram of a vacuum pump used for the LPCVD apparatus according to a ninth embodiment of the present invention.
Figure 18:
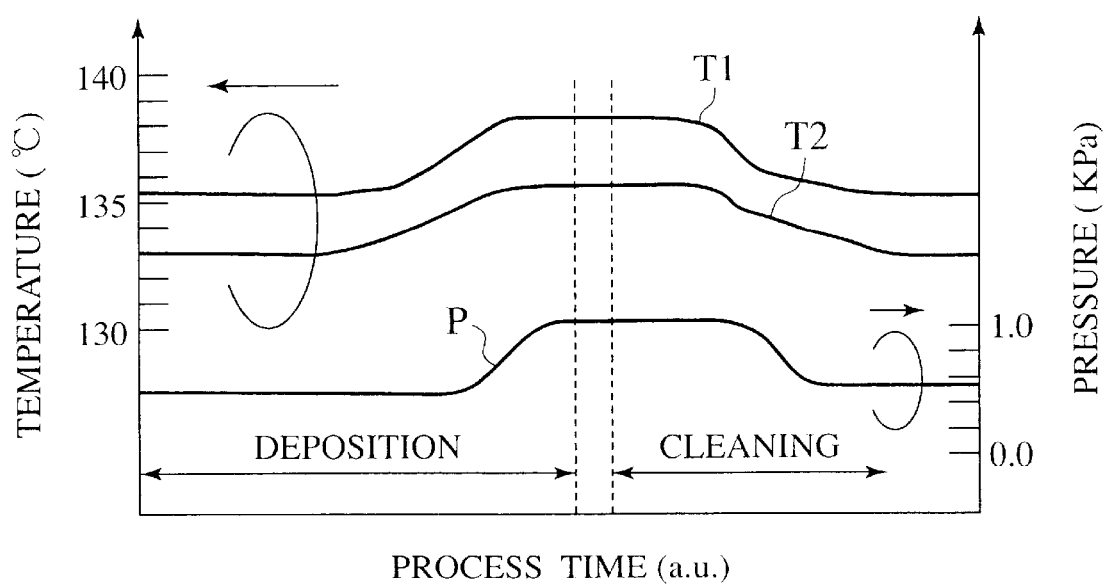
FIG. 18 is a graph illustrating output characteristics of a vacuum pump unit used in an LPCVD apparatus according to a ninth embodiment of the present invention.

FIG. 17 is a schematic cross-sectional diagram of a vacuum pump unit attached to the LPCVD apparatus of a ninth embodiment of the present embodiment, and FIG. 18 is a graph illustrating output characteristics of a vacuum pump unit.

A dry cleaning process similar to that illustrated in the eighth embodiment is performed using a LPCVD apparatus 66a having a vacuum pump unit shown in FIG. 17. In the ninth embodiment, a fluorine ($F_2$) gas is used as the gas species instead of the $ClF_3$ gas. The vacuum pump unit shown in FIG. 17 includes a booster pump 34 and a main pump 35 in the housing 31. An exhaust piping 32 is connected to an intake side of the booster pump 34 and an exhaust piping 33 is connected to an exhaust side of the main pump 35. Thermo couples 36 and a pressure gauge 37 are disposed on the housing 31 to monitor pressure and temperature for an inlet of the main pump, and temperature for a body of the main pump.

FIG. 18 illustrates the respective reading values of the thermo couples 36, and the pressure gauge 37 during the silicon film deposition and the dry cleaning of the vacuum pump unit. In every characteristic, it is found that each value rises during the deposition process, whereas it falls during the cleaning process. This is because by-products deposited in the CVD chamber are also deposited inside the vacuum pumps, and as the result, it becomes near clogging conditions, bringing about a rise in temperature and pressure. On the contrary, during the dry cleaning, since the by-products within the vacuum pumps are removed by the cleaning gas used for the dry cleaning, conductance within the vacuum pumps is improved resulting in a decrease in temperature and pressure. It is possible to perform the vacuum pump cleaning end determination through such vacuum pump condition monitoring.

Actually, it is possible to determine the end of pump cleaning at the time point when the monitoring temperature and pressure that have once risen start falling, or when the monitoring temperature and pressure fall to the initial temperature, by monitoring previously the temperature and pressure at the beginning of the deposition process and further monitoring during the film deposition and the dry cleaning. It is possible to manage efficiently to operate the LPCVD apparatus 66a by automatically performing such determination by the system controlling the LPCVD apparatus 66a, and in addition to manage efficiently to operate the entire manufacturing apparatuses included in the system.

According to the ninth embodiment, the dry cleaning may be performed sufficiently as required, an improvement in cleaning efficiency and reduction in process time may be measured. In addition, maintenance efficiency may be improved and the occurrence of particles may be avoided. Also, prevention against excessive etching at the dry cleaning location is effective in reducing damages to the CVD chamber components.

Other Embodiments

While the above embodiments have described the present invention, it should not be taken as meaning that the present invention is limited to the description and the drawings configuring a part of this disclosure. From this disclosure, a variety of substitutable embodiments and operational techniques will become apparent to those with regular skill in the art.

In the description of the embodiments that has been described, examples of the LPCVD for the $Si_3N_4$ film, the amorphous Si film, the poly-Si film and the TEOS film are described, however, it is similarly applicable to the LPCVD for the thin film with other materials such as silicon dioxide ($SiO_2$), and phosphosilicate glass (PSG).

In addition, an LPCVD apparatus is described by means of an example for a manufacturing apparatus, however, naturally, the present invention is not limited to the LPCVD apparatus. For example, other semiconductor manufacturing apparatus, such as a vacuum evaporation apparatus or a sputtering apparatus may also be utilized.

In addition, a combination of a mechanical booster pump and a dry pump connected in series is illustrated as a vacuum pump unit; however, a vacuum pump unit where a mechanical booster pump and an oil-sealed rotary pump are connected in series may also be used. Moreover, a vacuum pump unit including only a dry pump or an oil-sealed rotary pump, or a turbo-molecular pump may also be used.

Moreover, a silicon or similar semiconductor wafer is inserted and held within the CVD chamber of the LPCVD apparatus in which the dry cleaning has been performed by the system described in the above embodiments. A semiconductor device may be then fabricated efficiently depositing film such as the $Si_3N_4$ film, the amorphous Si film, the poly-Si film, the TEOS film and the $SiO_2$ film upon the semiconductor wafer using the LPCVD apparatus, and performing post-processes.

Various modifications will become possible for those skilled in the art after receiving the teachings of the present disclosure without departing from the scope thereof. Accordingly, it is natural that the present invention includes a variety of embodiments not described herein. The technical scope of the present invention described should be defined only based upon the following appropriate claims.

What is claimed is:

1. A system for determining dry cleaning timing, comprising:

a manufacturing apparatus configured to process materials assigned by a sequence of lots, the manufacturing apparatus having a chemical vapor deposition chamber configured to be evacuated, exhaust piping connected to an exhaust end of the chemical vapor deposition chamber, and a vacuum pump unit configured to evacuate the chemical vapor deposition chamber through the exhaust piping;

an apparatus controller configured to control the manufacturing apparatus and to obtain operational conditions of the manufacturing apparatus as apparatus information, where information includes an accumulated deposition thickness and a type description of deposited film in the chemical vapor deposition chamber, a condition of a post-process apparatus scheduled to process a lot after a process of the manufacturing apparatus, and a condition for incidental facilities of the manufacturing apparatus;

a lot information input terminal configured to obtain process conditions of one of the lots as lot information;

an apparatus information storage unit configured to store the apparatus information from the apparatus controller as an apparatus information database;

a lot information storage unit configured to store the lot information from the lot information input terminal as a lot information database; and a cleaning determination unit configured to determine timing to perform a dry cleaning of the manufacturing apparatus based on the apparatus information database and the lot information database.

2. The system of claim 1, wherein, the lot information includes deposition conditions of a next lot, deposition conditions of an urgent lot, and conditions for a post-process scheduled to process the lot after the process of the manufacturing apparatus.

3. A method for determining dry cleaning timing, comprising:

obtaining operational conditions of a manufacturing apparatus as apparatus information, the apparatus information including an accumulated deposition thickness in a chemical vapor deposition chamber installed in the manufacturing apparatus, a type description of a deposited film in the chemical vapor deposition chamber, a condition of a post-process apparatus scheduled to process a lot after a process of the manufacturing apparatus, and a condition for incidental facilities of the manufacturing apparatus;

obtaining process conditions of one of lots processed in the manufacturing apparatus as lot information; and determining timing to perform a dry cleaning for the manufacturing apparatus based on the apparatus information and the lot information.

4. The method of claim 3, wherein the lot information includes a type description of deposition film of a next lot, a deposition film thickness of the next lot, a type of deposition film of an urgent lot, a deposition film thickness of the urgent lot, and conditions for a post-process scheduled to process the lot after the process of the manufacturing apparatus.

5. The method of claim 4, wherein the dry cleaning timing is determined from at least one of information selected from a group consisting of the accumulated deposition thickness in the chemical vapor deposition chamber, the type of the deposited film in the chemical vapor deposition chamber, the deposition film thickness of the next lot, the deposition film thickness of the urgent lot, a sum of the accumulated deposition thickness and the deposition film thickness of the next lot, and a sum of the accumulated deposition thickness and the deposition film thickness of the urgent lot.

6. The method of claim 4, wherein the dry cleaning timing is determined from at least one of information selected from a group consisting of the accumulated deposition thickness in the chemical vapor deposition chamber, the type of the deposited film in the chemical vapor deposition chamber and the conditions for the post-process.

7. The method of claim 4, wherein the dry cleaning timing is determined from expected arrival timing for the next lot.

8. The method of claim 4, wherein the dry cleaning timing is determined from the condition of the vacuum pump unit configured to evacuate the chemical vapor deposition chamber.

9. The method of claim 4, wherein the dry cleaning timing is determined when the accumulated deposition thickness of a silicon nitride film grown in the chemical vapor deposition chamber exceeds 400 nm.

10. A dry cleaning method comprising:
depositing a film in a manufacturing apparatus;
obtaining operational conditions of the manufacturing apparatus as apparatus information, the apparatus information including an accumulated deposition thickness in a chemical vapor deposition chamber installed in the manufacturing apparatus, a type description of a deposited film in the chemical vapor deposition chamber, a condition of a post-process apparatus scheduled to process a lot after a process of the manufacturing apparatus, and a condition for incidental facilities of the manufacturing apparatus;
obtaining process conditions of one of lots to be processed in the manufacturing apparatus as lot information;
determining timing to perform a dry cleaning for the manufacturing apparatus based on the apparatus information and the lot information; and
performing the dry cleaning with a cleaning gas including a halogen gas.

11. The method of claim 10, wherein the halogen gas is a chlorine trifluoride gas.

12. The method of claim 10, wherein the cleaning gas includes the halogen gas mixed with at least a gas selected from a group consisting of a metal halide gas, a metallic compound gas, and an organo-metallic compound gas.

13. The method of claim 10, wherein at least a film selected from a group consisting of a metal film and a metallic compound film is deposited in the chemical vapor deposition chamber prior to the dry cleaning.

14. The method of claim 10, wherein the film an amorphous silicon film.

15. The method of claim 14, further comprising applying a heat treatment on the manufacturing apparatus prior to the dry cleaning.

16. The method of claim 10, wherein the film is a tetraethylorthosilicate film.

17. The method of claim 16, further comprising introducing a gas including a water vapor in the manufacturing apparatus prior to the dry cleaning.

18. The method of claim 10, further comprising:
forming a tetraethylorthosilicate film on a loading boat in the manufacturing apparatus before depositing the film;
weighing the loading boat in real-time during dry cleaning; and
determining a cleaning end timing by comparing a measuring weight to an initial weight of the tetraethylorthosilicate film deposited on the loading boat.

19. The method of claim 18, further comprising:
ending the dry cleaning after determining a cleaning end timing; and
depositing an additional tetraethylorthosilicate film upon the tetraethylorthosilicate film deposited on the loading boat.

20. The method of claim 10, further comprising;
forming a poly-Si film inside a chamber of the manufacturing apparatus before depositing the film;
measuring a temperature of the chamber in real-time during dry cleaning; and
determining a cleaning end timing by a variation of the temperature.

21. The method of claim 20, further comprising:
ending the dry cleaning after determining a cleaning end timing; and
depositing an additional poly-Si film upon the poly-Si film deposited inside the chamber.

22. The method of claim 20, further comprising:
measuring temperatures at a plurality of locations on the manufacturing apparatus; and
lowering the temperatures after determining the cleaning end timing.

23. The method of claim 22, further comprising:
flowing the cleaning gas additionally into an exhaust piping connected at an exhaust end of the chamber;
determining the cleaning end timing separately; and
stopping flowing the respective cleaning gas following determining the respective cleaning end timing.

24. The method of claim 10, further comprising:
monitoring characteristics of a vacuum pump unit in the manufacturing apparatus; and
determining the cleaning end timing by a variation of the characteristics.

25. The method of claim 10, wherein the lot information includes a type description of deposition film of a next lot, a deposition film thickness of the next lot, a type description of deposition film of an urgent lot, a deposition film thickness of the urgent lot, and conditions for a post-process scheduled to process the lot after the process of the manufacturing apparatus.

26. A method for manufacturing a semiconductor device, comprising:
depositing a film in a manufacturing apparatus;
obtaining operational conditions of the manufacturing apparatus as apparatus information, the apparatus information including an accumulated deposition thickness in a chemical vapor deposition chamber installed in the manufacturing apparatus, a type description of a deposited film in the chemical vapor deposition chamber, a condition of a post-process apparatus scheduled to process a lot after a process of the manufacturing apparatus, and a condition for incidental facilities of the manufacturing apparatus;

obtaining process conditions of one of lots to be processed in the manufacturing apparatus as lot information;

determining timing to perform a dry cleaning for the manufacturing apparatus based on the apparatus information and the lot information;

performing the dry cleaning with a cleaning gas including a halogen gas;

loading semiconductor wafers assigned as the one of the lots in a chamber of the manufacturing apparatus; and performing a film deposition on the semiconductor wafers.

27. The method of claim 26, the lot information includes a type description of deposition film of a next lot, a deposition film thickness of the next lot, a type description of deposition film of an urgent lot, a deposition film thickness of the urgent lot, and conditions for a post-process scheduled to process the lot after the process of the manufacturing apparatus.

* * * * *